United States Patent
Kueckendahl

(10) Patent No.: US 11,822,070 B2
(45) Date of Patent: Nov. 21, 2023

(54) ELECTROMAGNETIC RADIATION STEERING MECHANISM

(71) Applicant: ALLTEC ANGEWANDTE LASERLICHT TECHNOLOGIE GMBH, Selmsdorf (DE)

(72) Inventor: Peter J. Kueckendahl, Bad Oldesloe (DE)

( * ) Notice: Subject to any disclaimer, the term of this patent is extended or adjusted under 35 U.S.C. 154(b) by 550 days.

(21) Appl. No.: 16/766,577

(22) PCT Filed: Nov. 22, 2018

(86) PCT No.: PCT/EP2018/082271
§ 371 (c)(1),
(2) Date: May 22, 2020

(87) PCT Pub. No.: WO2019/101887
PCT Pub. Date: May 31, 2019

(65) Prior Publication Data
US 2020/0371346 A1  Nov. 26, 2020

Related U.S. Application Data

(60) Provisional application No. 62/589,966, filed on Nov. 22, 2017, provisional application No. 62/590,004, filed on Nov. 22, 2017.

(51) Int. Cl.
*G02B 26/10* (2006.01)
*B41J 3/407* (2006.01)
(Continued)

(52) U.S. Cl.
CPC .............. *G02B 26/101* (2013.01); *B08B 5/04* (2013.01); *B08B 15/04* (2013.01); *B23K 26/082* (2015.10);
(Continued)

(58) Field of Classification Search
CPC G02B 26/101; G02B 26/0875; G02B 26/106; G02B 27/0006; G02B 17/023;
(Continued)

(56) References Cited

U.S. PATENT DOCUMENTS 4,174,154 A  11/1979  Kawasaki
4,368,080 A   1/1983  Langen et al.
(Continued)

FOREIGN PATENT DOCUMENTS

CN  103299231 A   9/2013
DE  19817629 A1  10/1999
(Continued)

OTHER PUBLICATIONS

PCT/EP2018/082271 International Search Report and Written Opinion, dated Apr. 8, 2019, 15 pages.
(Continued)

*Primary Examiner* — Euncha P Cherry
(74) *Attorney, Agent, or Firm* — Wolter Van Dyke Davis, PLLC; Robert L. Wolter

(57) ABSTRACT

An electromagnetic radiation steering mechanism An electromagnetic radiation steering mechanism configured to steer electromagnetic radiation to address a specific location within a two-dimensional field of view comprising a first optical element having an associated first actuator configured to rotate the first optical element about a first rotational axis to change a first coordinate of a first steering axis in the two-dimensional field of view, a second optical element having an associated second actuator configured to rotate the second optical element about a second rotational axis to change a second coordinate of a second steering axis in the two-dimensional field of view, and an electromagnetic radiation manipulator optically disposed between the first and second optical elements. A first angle is defined between the
(Continued)

first and second rotational axes and a second angle is defined between the first and second steering axes. The electromagnetic radiation manipulator is configured to introduce a difference between the first angle and the second angle.

29 Claims, 15 Drawing Sheets

(51) Int. Cl.
| | |
|---|---|
| *B41M 5/24* | (2006.01) |
| *G02B 26/08* | (2006.01) |
| *B23K 26/082* | (2014.01) |
| *B23K 26/142* | (2014.01) |
| *B23K 26/364* | (2014.01) |
| *B23K 26/70* | (2014.01) |
| *B08B 5/04* | (2006.01) |
| *B08B 15/04* | (2006.01) |
| *B23K 26/12* | (2014.01) |
| *G02B 27/00* | (2006.01) |
| *H01S 3/00* | (2006.01) |
| *H01S 3/04* | (2006.01) |
| *H01S 3/041* | (2006.01) |
| *H01S 3/223* | (2006.01) |

(52) U.S. Cl.
CPC .......... *B23K 26/128* (2013.01); *B23K 26/142* (2015.10); *B23K 26/364* (2015.10); *B23K 26/703* (2015.10); *B41J 3/4073* (2013.01); *B41M 5/24* (2013.01); *G02B 26/0875* (2013.01); *G02B 26/106* (2013.01); *G02B 27/0006* (2013.01); *H01S 3/0071* (2013.01); *H01S 3/041* (2013.01); *H01S 3/0404* (2013.01); *H01S 3/2232* (2013.01)

(58) Field of Classification Search
CPC ........ G02B 26/06; G02B 26/108; B08B 5/04; B08B 15/04; B23K 26/082; B23K 26/128; B23K 26/142; B23K 26/364; B23K 26/703; B23K 35/0294; B23K 26/0096; B23K 26/1464; B23K 26/1476; B23K 26/702; B23K 37/003; B23K 9/323; B41J 3/4073; B41M 5/24; H01S 3/0071; H01S 3/0404; H01S 3/041; H01S 3/2232
See application file for complete search history.

(56) References Cited

U.S. PATENT DOCUMENTS

| | | |
|---|---|---|
| 2004/0022480 A1 | 2/2004 | Riester |
| 2006/0151449 A1 | 7/2006 | Warner, Jr. |
| 2015/0168713 A1* | 6/2015 | Nowatzyk .......... G02B 26/0816 359/201.2 |
| 2018/0172994 A1* | 6/2018 | Robbins ............... G02B 26/101 |
| 2018/0207750 A1* | 7/2018 | Carter ................... B29C 64/386 |
| 2018/0333962 A1* | 11/2018 | Greggio ................. B44C 1/228 |

FOREIGN PATENT DOCUMENTS

| | | |
|---|---|---|
| DE | 10255747 A1 | 6/2004 |
| EP | 2471658 A1 | 7/2012 |
| EP | 2564977 A2 | 3/2013 |
| JP | 2002-066770 A | 3/2002 |
| JP | 2014-030179 A | 2/2014 |
| JP | 2016-034655 A | 3/2016 |
| WO | 2015057306 A1 | 4/2015 |

OTHER PUBLICATIONS

CN Application 201880087472.1 Office Action and English Translation, dated Sep. 27, 2021, 28 pages.
CN Application 201880087472.1 English Translation of Search Report, dated Sep. 18, 2021, 3 pages.
PCT/EP2018/082271 Partial Search Report, dated Feb. 11, 2019, 16 pages.
PCT/EP2018/082271 International Preliminary Report on Patentability, dated May 26, 2020, 11 pages.
Japanese Patent Office Action dated Oct. 4, 2022; Aug. 19, 2022 in Japanese Application No. 2020-545874.

* cited by examiner

ELECTROMAGNETIC RADIATION STEERING MECHANISM

TECHNICAL FIELD

The present invention relates to an electromagnetic radiation steering mechanism. Aspects and implementations of the present disclosure are directed generally to laser scanning and laser marking equipment.

BACKGROUND

Current laser markers and scanners are limited during automated production operations in packaging as well as in parts marking production lines. Current laser markers and scanners are typically fixed into production systems relative to articles being marked.

Known electromagnetic radiation steering mechanisms comprise two mirrors. A first mirror is configured to rotate about a first rotational axis to steer electromagnetic radiation along a first steering axis and a second mirror is configured to rotate about a second rotational axis to steer electromagnetic radiation along a second steering axis. The first steering axis and the second steering axis are perpendicular such that the electromagnetic radiation may be steered about a two dimensional field of view. In order to achieve the perpendicular first and second steering axes, the first and second rotational axes of the first and second mirrors in known electromagnetic radiation steering mechanisms are orthogonally oriented with respect to each other. In known electromagnetic radiation steering mechanisms, the rotational axes and the steering axes may therefore be described as being directly coupled. That is, in order for the first and second steering axis to be orthogonal, the first and second rotational axes of the mirrors must also be orthogonal. This often results in large, heavy and cumbersome electromagnetic radiation steering mechanisms because a housing of the electromagnetic radiation steering mechanism must be large enough to accommodate orthogonally oriented steering mirrors and their associated actuators.

It is in object of the present invention to provide an electromagnetic radiation steering mechanism that obviates or mitigates one or more problems of the prior art whether identified herein or elsewhere.

SUMMARY

Aspects and embodiments disclosed herein provide for the easy integration and operation of optical scanning or marking systems, for example, laser scanning or marking systems, into production systems. Aspects and embodiments disclosed herein include an optical scanning system that may be inserted co-axially (i.e. substantially parallel) to the laser beam of a laser scanning or marking system. The compact size of the resulting scanning/marking head facilitates integration of laser scanning or marking equipment into production lines.

According to a first aspect of the invention, there is provided an electromagnetic radiation steering mechanism configured to steer electromagnetic radiation to address a specific location within a two-dimensional field of view comprising a first optical element having an associated first actuator configured to rotate the first optical element about a first rotational axis to change a first coordinate of a first steering axis in the two-dimensional field of view, a second optical element having an associated second actuator configured to rotate the second optical element about a second rotational axis to change a second coordinate of a second steering axis in the two-dimensional field of view, and an electromagnetic radiation manipulator optically disposed between the first and second optical elements, wherein a first angle is defined between the first and second rotational axes, a second angle is defined between the first and second steering axes, and the electromagnetic radiation manipulator is configured to introduce a difference between the first angle and the second angle.

The electromagnetic radiation manipulator may be referred to as an electromagnetic radiation spatial distribution transformer. That is, the electromagnetic radiation manipulator may be configured to manipulate incident electromagnetic radiation by transforming the electromagnetic radiation from a first propagation direction and/or orientation to a different propagation direction and/or orientation. The electromagnetic radiation manipulator may be referred to as an electromagnetic radiation spatial distribution rotator. That is, the electromagnetic radiation manipulator may be configured to manipulate incident electromagnetic radiation by rotating a propagation direction and/or orientation of the electromagnetic radiation. The electromagnetic radiation manipulator may be considered to be a fixed assembly compared to the rotatable first and second optical elements.

Each of the first and second optical elements may be referred to as a deflector or a variable deflector. That is, the first and second optical elements may be configured to deflect incident electromagnetic radiation in a variable manner such that, when the first and/or second optical element is rotated, the electromagnetic radiation exiting the electromagnetic radiation steering mechanism is steered about the two-dimensional field of view. Rotation of the first or second optical elements may vary a deflection of the electromagnetic radiation that is caused by the first and/or second optical elements.

Each of the first and second steering axes may be referred to as a deflection axis or a deflection degree of freedom. This is because each optical element may be configured to deflect the electromagnetic radiation and thereby change a propagation direction and/or orientation of the electromagnetic radiation. The two deflection degrees of freedom associated with the first and second optical elements may combine to address specific locations within the two dimensional field of view about which the electromagnetic radiation may be steered.

The two dimensional field of view may correspond to an imaginary plane at a fixed distance from the electromagnetic radiation steering mechanism onto which the electromagnetic radiation is projected. For example, the two dimensional field of view may be substantially coplanar with a portion of a surface of a product that is to be marked using the electromagnetic radiation.

The two dimensional field of view may, for example, have dimensions of about 60 mm by about 80 mm. The two dimensional field of view may, for example, have dimensions of about 200 mm by about 300 mm. A size of the two dimensional field of view may at least partially depend upon a distance between an output of the electromagnetic radiation steering mechanism and the surface upon which the electromagnetic radiation is steered. If the electromagnetic radiation steering mechanism is used as part of a marking head of a laser marking system, then a distance between the output of the marking head and the product to be marked may be between about 100 mm and about 500 mm, e.g. about 300 mm.

Each of the first and second actuators may be referred to as a drive mechanism. That is, the first actuator is configured to drive a rotation of the first optical element about the first rotational axis and the second actuator is configured to drive a rotation of the second optical element about the second rotational axis.

The first angle may be zero. That is, the first and second rotational axes may be substantially parallel. Alternatively, the first angle may be non-zero. That is, the first and second rotational axes may be non-parallel.

For a given point in the two dimensional field of view, rotating the first optical element will cause a position of the electromagnetic radiation to change along the first steering axis and rotating the second optical element will cause a position of the electromagnetic radiation to change along the second steering axis. There may be a degree of linear independence between the first steering axis and the second steering axis. For example, the second angle may be less than 90° (e.g. about 80°) and the electromagnetic radiation steering mechanism may still effectively address multiple locations within the two dimensional field of view about which the electromagnetic radiation may be steered. The first steering axis and/or the second steering axis may not be linear. For example, the first steering axis and/or the second steering axis may be curvilinear.

Each steering axes may be described using any desired coordinate system e.g. a Cartesian coordinate system, a spherical polar coordinate system, a cylindrical polar coordinate system, etc. For example, when describing the steering axes using Cartesian coordinates, an "x" coordinate may be considered to be the first coordinate of the first steering axis and a "y" coordinate may be considered to be the second coordinate of the second steering axis. Alternatively, when describing the first and second steering axes using spherical polar coordinates, a radial coordinate may be considered to be the first coordinate of the first steering axis and an azimuthal coordinate may be considered to be the second coordinate of the second steering axis.

Rotation of the first and second optical elements may provide one to one mapping of the associated change in the first and second steering coordinates. Rotating one of the optical elements may exclusively steer the electromagnetic radiation in the associated steering axis.

In known electromagnetic radiation steering mechanisms, the first angle and the second angle are equal. That is, in order to achieve orthogonal steering axes to steer the electromagnetic radiation about a two dimensional field of view, the first and second rotational axes are also orthogonal. In known electromagnetic radiation steering mechanisms, the rotational axes and the steering axes may therefore be described as being directly coupled. The electromagnetic radiation steering mechanism disclosed herein advantageously decouples the orientations of the first and second rotational axes of the first and second optical elements from the orientations of the first and second steering axes, thereby allowing for greater design freedom and a broader range of applications.

The electromagnetic radiation steering mechanism disclosed herein advantageously decouples the orientations of the first and second rotational axes of the first and second optical elements from the orientations of the first and second steering axes, thereby allowing for greater design freedom. The electromagnetic radiation steering mechanism may be used in a broader range of applications, including applications in which known electromagnetic radiation steering mechanisms are not suitable due to their size and/or weight. One such application involves marking products on a production line using a laser marking system by incorporating the electromagnetic radiation steering mechanism into a marking head. The electromagnetic radiation steering mechanism according to the invention may enable smaller, lighter marking heads to be used, thereby simplifying installation of the laser marking system and also granting greater flexibility in how the marking head is used on the production line.

The first rotational axis and the second rotational axes may be non-orthogonal.

Having non-orthogonal first and second rotational axes advantageously provides a greater freedom of physical arrangement of the first and second optical elements, even when the first and second steering axes are orthogonal.

The first rotational axis and the second rotational axes may be substantially parallel.

Having substantially parallel first and second rotational axes advantageously provides a compact arrangement of the first and second optical elements, thereby reducing a size and weight of the electromagnetic radiation steering mechanism. This reduction in size and weight advantageously allows the electromagnetic radiation steering mechanism to be used in a greater number of applications where size and/or weight may previously have been a restricting factor, e.g. the marking head of a laser marking system.

The first angle may be less than about 45°. The first angle may be less than about 10°. The first angle may be less than about 5°. The first angle may be less than about 2°. The first angle may be about 0°.

Reducing the extent of the first angle may advantageously result in a more compact electromagnetic radiation steering mechanism.

The first steering axis and the second steering axis may be substantially orthogonal.

Having substantially orthogonal first and second steering axes may advantageously provide a full two dimensional field of view about which the electromagnetic radiation may be steered by the electromagnetic radiation steering mechanism.

The second angle may be between about 70° and about 110°. The second angle may be between about 80° and about 100°. The second angle may be between about 85° and about 95°. The second angle may be about 90°.

The electromagnetic radiation manipulator may be configured to introduce a difference of more than about 45° between the first angle and the second angle. The electromagnetic radiation manipulator may be configured to introduce a difference of more than about 70° between the first angle and the second angle. The electromagnetic radiation manipulator may be configured to introduce a difference of about 90° between the first angle and the second angle.

Increasing the difference between the first angle and the second angle that is introduced by the electromagnetic radiation manipulator up to about 90° may advantageously further decouple the orientation of the rotational axes from the orientation of the steering axes. This in turn may advantageously provide greater design freedom when assembling the first and second optical elements without having to reduce and/or limit the two dimensional field of view about which the electromagnetic radiation may be steered.

The first optical element may be adjacent the second optical element. The first optical element and the second optical element may be offset from one another along a direction parallel to the first and/or second rotational axes. A minimal distance may exist between the first rotational axis and second rotational axis. That is, the amount of space between the first optical element and the second optical element may be reduced in order to further reduce a size of the electromagnetic radiation steering mechanism. A size of the first and second optical elements may at least partially determine a minimal distance between the first rotational axis and the second rotational axis. A range of rotation of the first and second optical elements (i.e. maximum and/or minimum angles by which the first and second optical elements may be rotated about the first and second rotational axes) may at least partially determine a minimal distance between the first rotational axis and the second rotational axis. The first and second optical elements may come into contact with each other upon rotation if the distance between the first rotational axis and the second rotational axis is insufficient. A size of the first actuator and/or the second actuator may at least partially determine a minimal distance between the first rotational axis and the second rotational axis. The first actuator and/or the second actuator may be mounted such that their size does not determine the minimal distance between the first rotational axis and the second rotational axis.

The first optical element may be configured to receive the electromagnetic radiation and direct the electromagnetic radiation to the electromagnetic radiation manipulator. The electromagnetic radiation manipulator may be configured to direct the electromagnetic radiation to the second optical element.

The second optical element may be configured to direct the electromagnetic radiation to an optical output of the electromagnetic radiation steering mechanism.

The second optical element may be configured to direct the electromagnetic radiation to an optical input of an optical device configured to receive the steered electromagnetic radiation.

The electromagnetic radiation steering mechanism may, for example, be configured to steer the electromagnetic radiation about a photosensitive detector and/or steer the electromagnetic radiation between different optical inputs of a given optical device.

At least one of the first optical element and the second optical element may be reflective.

Rotation of the reflective optical element may redirect electromagnetic radiation reflecting from the reflective optical element.

The first optical element may comprise a first reflective surface configured to receive the electromagnetic radiation. The second optical element may comprise a second reflective surface configured to receive the electromagnetic radiation.

The first optical element and/or the second optical element may comprise a reflective coating such as, for example, a coating comprising gold and/or silver.

The second reflective surface may be larger than the first reflective surface. This may ensure that the electromagnetic radiation reflected by the first reflective surface is received by the second reflective surface across a range of rotations of the first reflective surface. That is, the second reflective surface may be large enough to receive the electromagnetic radiation after a maximum rotation of the first reflective surface in either direction about the first rotational axis. A steering distance by which the electromagnetic radiation is steered between the first reflective surface and the second reflective surface may be at least partially determined by a distance between the first reflective surface and the second reflective surface. That is, the greater the separation between the first reflective surface and the second reflective surface, the larger the second reflective surface may be in order to still receive the steered electromagnetic radiation. It may therefore be advantageous to reduce a distance between the first reflective surface and the second reflective surface to reduce and/or limit a steering distance of the electromagnetic radiation within the electromagnetic radiation steering mechanism between the first reflective surface and the second reflective surface.

The first rotational axis and the first reflective surface may be substantially parallel.

The second rotational axis and the second reflective surface may be substantially parallel.

At least one of the first optical element and the second optical element may be refractive.

The refractive optical element may be a prism.

At least one of the first and second optical elements may be diffractive.

The diffractive optical element may comprise a grating. The grating may be formed via etching.

At least one of the first and second optical elements may be polarizing.

The polarizing optical element may be configured to change linearly polarized electromagnetic radiation to circularly polarized electromagnetic radiation.

Radiation emitted from a laser (e.g. a $CO_2$ laser) tends to be linearly polarised. Circularly polarized radiation may be preferable to linearly polarised radiation for some applications such as, for example, laser marking of products.

The electromagnetic radiation manipulator may comprise a first mirror and a second mirror.

The first mirror and/or the second mirror may comprise a reflective coating such as, for example, a coating comprising gold and/or silver.

The first mirror may be configured to receive the electromagnetic radiation after the electromagnetic radiation has interacted with the first optical element and direct the electromagnetic radiation to the second mirror.

The second mirror may be configured to receive the electromagnetic radiation after the electromagnetic radiation has interacted with the first mirror and direct the electromagnetic radiation to the second optical element.

The first mirror and the second mirror may be fixed with respect to each other.

The first mirror may be arranged so as to apply about a 90° change in direction of the electromagnetic radiation.

The first mirror may optically disposed at a 45° angle with respect to incident electromagnetic radiation.

The second mirror may be arranged so as to apply about a 90° change in direction of the electromagnetic radiation.

The second mirror may be optically disposed at a 45° angle with respect to incident electromagnetic radiation.

The 90° change in direction of the electromagnetic radiation caused by the first mirror may take place about a first axis of reflection. The 90° change in direction of the electromagnetic radiation caused by the second mirror may take place about a second axis of reflection. The first axis of reflection and the second axis of reflection may be non-parallel.

The first axis of reflection may be parallel to and/or in plane with the surface of the first mirror from which the electromagnetic radiation reflects. The second axis of reflection may be parallel to and/or in plane with the surface of the second mirror from which the electromagnetic radiation reflects.

The first axis of reflection and the second axis of reflection may be substantially perpendicular.

The first mirror may alter the propagation direction of the electromagnetic radiation by about 90° about a first axis in three dimensional space. The second mirror may alter the propagation direction of the electromagnetic radiation by about 90° about a second axis in three dimensional space. The first axis and the second axis may be different. The first axis and the second axis may be non-parallel. The first axis and the second axis may be perpendicular.

At least one of the first actuator and second actuator may comprises a galvanometer motor. Alternatively, at least one of the first actuator and the second actuator may comprise a piezoelectric drive, a magnetic drive, a direct current drive, a stepper motor, a servomotor, etc.

A rotation of the first optical element or the second optical element by an angle of x° may change a propagation direction of the electromagnetic radiation by an angle of 2×° due to the electromagnetic radiation undergoing reflection from the first optical element or the second optical element.

A displacement of the electromagnetic radiation within the two dimensional field of view that is caused by rotation of the first optical element or the second optical element may be determined using trigonometry with knowledge of the angle by which the first optical element or the second optical element was rotated and knowledge of the focal distance between the electromagnetic radiation steering mechanism and the two dimensional field of view. Each actuator may, for example, be configured to rotate each optical element by about ±20°.

The electromagnetic radiation may be a laser beam. The electromagnetic radiation may, for example, be generated by a $CO_2$ laser. The electromagnetic radiation may comprise infrared radiation, near-infra-red radiation, ultraviolet radiation, visible radiation, etc. The electromagnetic radiation may have a power of about 5 W or more. The electromagnetic radiation may have a power of about 10 W or more. The electromagnetic radiation may have a power of about 100 W or less. The electromagnetic radiation may have a power of about 100 kW or less.

The electromagnetic radiation may have a beam width of more than about 0.01 mm. The electromagnetic radiation may have a beam width of less than about 10 mm. For example, the electromagnetic radiation may have a beam width of about 5 mm.

According to a second aspect of the invention, there is provided a laser marking system for marking a product comprising a marking head and the electromagnetic radiation steering mechanism of the first aspect of the invention The laser marking system may comprise a radiation source such as a laser. The laser may be a lower power laser (e.g. suitable power for marking consumer products, engraving, flexographic printing, etc.). The laser may be a higher power laser (e.g. suitable power for 3D printing, ablation devices, digital cutters, etc.).

The first rotational axis and the second rotational axes may be substantially parallel. The electromagnetic radiation steering mechanism may be installed substantially parallel to the marking head of the laser marking system such that a length of the marking head is substantially parallel to the first and second axes of rotation.

Known laser marking systems typically include a bulky and heavy marking head which is sized in order to accommodate an electromagnetic radiation steering mechanism that has orthogonal first and second optical elements. The electromagnetic radiation steering mechanism of the first aspect of the invention advantageously enables parallel first and second optical elements, which in turn enables parallel installation in the marking head of the laser marking system rather than perpendicular installation. Having the electromagnetic radiation steering mechanism installed substantially parallel to a length (i.e. the greatest of three dimensions) of the marking head of the laser marking system advantageously reduces the size and weight of the marking head compared to known laser marking systems, thereby enabling a greater variety of uses and installation environments. The length may be referred to as an axis, or a primary axis of the marking head.

The marking head may comprise a cylindrical housing.

The cylindrical housing may have a diameter of about 40 mm. The cylindrical housing may have a length of about 350 mm. The cylindrical housing may have substantially similar dimensions as the marking head of a model 1860 continuous inkjet printer available from Videojet Technologies Inc., Wood Dale, Ill. The marking head may have a weight of about 0.5 kg or less.

The laser marking system may further comprise a flexible umbilical connected to the marking head. The flexible umbilical may be configured to transmit power and/or control signals to the marking head.

The marking head may comprise a radiation shield for protecting a user of the laser marking system from stray radiation.

The radiation shield may comprise a sensor configured to detect radiation emanating from a gap between a portion of the radiation shield and the product.

The sensor may be configured to detect escaping radiation to determine whether or not the radiation shield is blocking an adequate amount of stray light to satisfy laser safety requirements. The sensor may be configured to detect radiation emanating from the product. For example, the sensor may be configured to detect radiation which has scattered from the product.

The radiation shield may comprise an integrated extraction inlet that is fluidly coupled to an extraction device. The extraction device may be configured to generate a flow of extraction fluid for extracting matter generated by an interaction between a laser beam and the product.

The integrated extraction inlet and the flow of extraction fluid advantageously allows for the removal of matter (e.g. debris, gases, etc.) that is generated when the electromagnetic radiation is incident upon the product to be marked.

The integrated extraction inlet may be configurable to be located substantially adjacent to the product.

The radiation shield may comprise a flange for providing further protection to a user of the laser marking system from stray radiation.

The flange may take the form of a labyrinthine or cone-shaped projection that projects from a lower portion of the radiation shield.

The radiation shield may comprise a flexible member arranged to reduce a gap between the radiation shield and the product for providing further protection to a user of the laser marking system from stray radiation. The flexible member may be a brush.

The laser marking system may further comprise a variable optical path length assembly configured to define an optical path from an input to an output.

The marking head may further comprise a variable optical path length assembly configured to define an optical path from an input to an output. The variable optical path length assembly comprises a rotatable path length adjuster. The rotatable path length adjuster is configured to: rotate about an axis, receive a radiation beam along an input path; direct the radiation beam along a first intermediate path; receive the radiation beam along a second intermediate path; and direct the radiation beam along an output path. The variable optical path length assembly further comprises a fixed optical element. The fixed optical element is configured to: receive the radiation beam directed by the rotatable path length adjuster along the first intermediate path; and direct the radiation beam back toward the rotatable path length adjuster along the second intermediate path. The geometric path length between the input and the output varies in dependence upon an angular position of the rotatable path length adjuster. The output path is independent of the angular position of the rotatable path length adjuster.

By providing a path length adjuster that provides a variable geometric path length as a function of an angular position of the rotatable path length adjuster it is possible to precisely and accurately vary path length while avoiding the limitations associated with conventional linear path length adjustment devices. An optical path between the input and the output may comprise a plurality of sub-paths, each sub-path being provided between two optical components.

Moreover, by arranging the rotatable path length adjuster such that the output path is independent of the angular position of the rotatable path length adjuster (and therefore independent of the path length), it is possible to provide a fixed relationship between the input and output paths, such that the variable optical path length assembly can be incorporated into a marking head having a fixed geometry.

The axis about which the path length adjuster is configured to rotate may have a fixed spatial relationship with the input and the output. Thus, the as the path length adjuster rotates about the axis, the path length adjuster may be considered to have an angular relationship with the input and the output, or to have an angular position with respect to a fixed frame of reference.

By providing the fixed optical element which is configured to receive the radiation along the first intermediate path, and to direct the radiation beam back toward the optical path length adjuster along the second intermediate path, a first intermediate path angle is defined between the first intermediate path and the part of the rotatable path length adjuster that causes the radiation to be directed along the first intermediate path. A second intermediate path angle is defined between the second intermediate path and the part of the rotatable path length adjuster that receives radiation along the second intermediate path. The first and second intermediate path angles may vary in a related way in dependence upon the angular position of the rotatable path length adjuster.

The geometric path length between the input and the output may vary continuously in dependence upon the angular position of the rotatable path length adjuster. By providing a path length adjuster that provides a continuously variable geometric path length as a function of an angular position of the rotatable path length adjuster it is possible to precisely and accurately vary path length, without having to rely on discrete path length options (none of which may suit a particular requirement).

The rotatable path length adjuster may comprise a first optical component configured to receive the radiation beam along the input path and to direct the radiation beam along a third intermediate path. The rotatable path length adjuster may comprise a second optical component configured to receive the radiation beam along the third intermediate path and to direct the radiation beam along the first intermediate path.

An incoming radiation beam provided along the input path can be first directed (e.g. reflected) by the first optical component (along the third intermediate path), and then further directed (e.g. reflected) by the second optical component (along the first intermediate path). By providing each of the first and second optical components as part of the rotatable path length adjuster, it is possible to vary the inclination and position of each of those elements by rotating the rotatable path length adjuster, thereby altering the path length.

The variable optical path length assembly may be configured such that a rotation of the rotatable path length adjuster about the axis causes: a first change in a first angle defined between the input path and a part of the first optical component with which the radiation beam interacts; and a second change in a second angle defined between the input path and a part of the second optical component with which the radiation beam interacts. The first change and the second change may be equal in magnitude and opposite in direction.

For example, whereas the first and second optical components may each be rotated by the same angle about the same axis, the parts of the optical components which interact with the radiation beam may be facing in opposition directions, resulting the in the same rotation of the rotatable path length adjuster increasing the angle between the input path and one element, and decreasing the angle between the input path and the other element. In this way, the variable optical path length assembly can be configured to vary a path length without varying the direction of the output beam.

It will be understood that while the angle of the second optical component is defined above with reference to the input path, that the second optical component may not interact directly with the input path. However, the input path is used to provide a convenient directional reference against which other directions or inclinations (and in particular changes in directions or inclinations) can be compared.

The first optical component and the second optical component may have a fixed spatial relationship, such that rotation of the rotatable path length adjuster about the axis of rotation causes the first optical component and the second optical component to rotate about the axis of rotation. By providing a fixed spatial relationship between the first and second optical components, the relationship between the input path and the first intermediate path can be kept fixed, regardless of the angular position of the rotatable path length adjuster. That is, a variable change in angle an angle between the radiation beam and the first optical component created by the movement of the first optical component, can be compensated for by a corresponding change in angle created by the movement action of the second optical component, thereby resulting in a fixed angular relationship between the input path and the first intermediate path.

Once the incoming radiation beam has been directed by the first and second optical components along the first intermediate path, the beam can be reflected back towards the rotatable path length adjuster by the fixed optical element along the second intermediate path.

Then, the radiation beam provided along the second intermediate path can be re-directed (e.g. reflected) by the second optical component so as to travel along a fourth intermediate path. Then, the radiation beam can be further directed (e.g. reflected) by the first optical component so as to travel along the output path.

Thus, by providing each of the first and second optical components as part of the rotatable path length adjuster, it is possible to vary the inclination and position of each of those elements by rotating the rotatable path length adjuster, thereby altering the path length, and directing an incoming radiation beam from the input to the output as required.

The first optical component may comprise a first reflective surface configured to receive the radiation beam along the input path and to direct the radiation beam along a third intermediate path. The second optical component may comprise a second reflective surface is configured to receive the radiation beam along the third intermediate path and to direct the radiation beam along the first intermediate path. The first optical component may comprise a first reflector. The second optical component may comprise a second reflector.

The second optical component may be configured to receive the radiation beam along the second intermediate path and to direct the radiation beam along a fourth intermediate path. The first optical component may be configured to receive the radiation beam along the fourth intermediate path and to direct the radiation beam along the output path.

The first reflective surface may be a planar surface. The second reflective surface may be a planar surface. The first and second reflective surfaces may be substantially parallel to each other.

An incoming radiation beam provided along the input path can be first reflected by the first reflective surface (along the third intermediate path), and then reflected by the second reflective surface (along the first intermediate path). By providing parallel first and second reflective surfaces, the relationship between the input path and the first intermediate path can be kept parallel, regardless of the angular position of the rotatable path length adjuster. That is, a variable change in angle created by reflection by the first reflective surface, will be compensated for by a corresponding change in angle created by reflection by the second reflective surface, thereby resulting in a fixed angular relationship between the input path and the first intermediate path.

A similar relationship can be provided for the return optical path from the fixed optical element, so as to cause the second intermediate path and to be kept parallel to the output path, regardless of the angular position of the rotatable path length adjuster.

An angle defined between each of the first and second reflective surfaces and the axis of rotation may be the substantially same.

By providing the first and second reflective surfaces such that they each have a substantially equal angle to the axis of rotation, rotation of the rotatable path length adjuster can be caused to change the path length in one direction (i.e. along the direction of propagation) without causing any change in the position of the output path relative to the input path in a direction perpendicular to the direction of beam propagation. Any offset in the beam position in a direction perpendicular to the direction of beam propagation caused by one of the reflective surfaces can be offset by the other one of the reflective surfaces. Resulting in the output path remaining independent of the rotational position (and associated geometric path length).

The first and second reflective surfaces may be substantially parallel to the axis of rotation. The input path may be substantially perpendicular to the axis of rotation. The output path may be substantially perpendicular to the axis of rotation. The input path may be substantially parallel to the output path.

By providing the first and second reflective surfaces such that they are substantially parallel to the axis of rotation, the angle of those surfaces relative to an input path which is substantially perpendicular to the axis of rotation will not change as the rotatable path length adjuster rotates about the axis. In this way, rotation of the rotatable path length adjuster can be caused the change the path length in one direction (i.e. along the direction of propagation) without causing any change in the position of the output path relative to the input path in a direction perpendicular to the direction of beam propagation, thereby enabling optical elements positioned at the output and input to remain fixed in position in spite of changes in path length.

The rotatable path length adjuster may comprise a rotatable base. The first and second optical components may be mounted on the rotatable base. The various components mounted on the rotatable base may be fixedly mounted, such that any rotation of the rotatable base about the axis causes a corresponding rotation of each of the various mounted components about the axis.

The variable optical path length assembly may comprise a first reflector mounted on the rotatable base and extending from the base, and a second reflector mounted on the rotatable base and extending from the base. The first and/or second reflectors may each extend in a direction substantially parallel to the axis of rotation of the base.

Depending on the distance between the particular optical component (and more particularly a part of the particular optical component which interacts with the radiation beam) and the axis, a rotation about the axis will cause in change in the length of the sub-paths associated with that optical component.

The geometric path length may be configured to vary in dependence upon the angular position of the rotatable path length adjuster within a predetermined angular range The predetermined angular range may, for example, be 20 degrees, which may, for example, comprise a variation of plus or minus 10 degrees from a neutral, or default, position.

If the angular position of the rotatable path length adjuster is varied beyond the predetermined range, the various optical components may begin to interfere with the various intermediate optical paths. As such, by limiting the range of motion to the predetermined range, it is possible to avoid any loss of performance.

According to a third aspect of the invention, there is provided an electromagnetic radiation detector comprising the electromagnetic radiation steering mechanism of the first aspect of the invention.

The electromagnetic radiation detector may form part of a camera. The electromagnetic radiation detector may form part of a time-of-flight sensor.

The first rotational axis and the second rotational axes may be substantially parallel. The electromagnetic radiation steering mechanism may be installed substantially parallel to the electromagnetic radiation detector such that a length of the electromagnetic radiation detector is substantially parallel to the first and second axes of rotation.

Known electromagnetic radiation detectors typically include a bulky and heavy housing which is sized in order to accommodate an electromagnetic radiation steering mechanism that has orthogonal first and second optical elements. The electromagnetic radiation steering mechanism of the first aspect of the invention advantageously enables parallel first and second optical elements, which in turn enables parallel installation in the housing of the electromagnetic radiation detector (rather than perpendicular installation). Having the electromagnetic radiation steering mechanism installed substantially parallel to a length (i.e. the greatest of three dimensions) of the housing of the electromagnetic radiation detector advantageously reduces the size and weight of the housing compared to known electromagnetic radiation detectors, thereby enabling a greater variety of uses and installation environments. The length may be referred to as an axis, or a primary axis of the electromagnetic radiation detector.

The electromagnetic radiation detector may be configured to emit and receive electromagnetic radiation (e.g. as a time of flight sensor).

According to a fourth aspect of the invention, there is provided an optical scanner comprising the electromagnetic radiation steering mechanism of the first aspect of the invention.

The optical scanner may form part of a medical device such as, for example, a skin resurfacing device.

The first rotational axis and the second rotational axes may be substantially parallel. The electromagnetic radiation steering mechanism may be installed substantially parallel to the optical scanner such that a length of the optical scanner is substantially parallel to the first and second axes of rotation.

Known optical scanners typically include a bulky and heavy housing which is sized in order to accommodate an electromagnetic radiation steering mechanism that has orthogonal first and second optical elements. The electromagnetic radiation steering mechanism of the first aspect of the invention advantageously enables parallel first and second optical elements, which in turn enables parallel installation in the housing of the optical scanner (rather than perpendicular installation). Having the electromagnetic radiation steering mechanism installed substantially parallel to a length (i.e. the greatest of three dimensions) of the housing of the optical scanner advantageously reduces the size and weight of the housing compared to known optical scanners, thereby enabling a greater variety of uses and installation environments. The length may be referred to as an axis, or a primary axis of the optical scanner.

The optical scanner may comprise a laser source configured to generate and direct the electromagnetic radiation in a direction parallel to the first and second axes of rotation.

According to a fifth aspect of the invention, there is provided a method of steering electromagnetic radiation to address a specific location within a two-dimensional field of view comprising receiving electromagnetic radiation at a first optical element that is rotatable about a first rotational axis to change a first coordinate of a first steering axis in the two-dimensional field of view, directing the electromagnetic radiation to an electromagnetic radiation manipulator optically disposed between the first optical element and a second optical element, directing the electromagnetic radiation to the second optical element that is rotatable about a second rotational axis to change a second coordinate of a second steering axis in the two-dimensional field of view, defining a first angle between the first and second rotational axes, defining a second angle between the first and second steering axes, and using the electromagnetic radiation manipulator to introduce a difference between the first angle and the second angle.

According to a sixth aspect of the invention, there is provided a method of marking a product using an electromagnetic radiation steering mechanism comprising receiving electromagnetic radiation at a first optical element that is rotatable about a first rotational axis to change a first coordinate of a first steering axis in the two-dimensional field of view, directing the electromagnetic radiation to an electromagnetic radiation manipulator optically disposed between the first optical element and a second optical element, directing the electromagnetic radiation to the second optical element that is rotatable about a second rotational axis to change a second coordinate of a second steering axis in the two-dimensional field of view, defining a first angle between the first and second rotational axes, defining a second angle between the first and second steering axes, using the electromagnetic radiation manipulator to introduce a difference between the first angle and the second angle, and steering the electromagnetic radiation about the product by rotating the first and second optical elements.

The electromagnetic radiation steering mechanism may be located within a marking head of a laser marking system. The method may further comprise moving the marking head during the marking.

The compact and lightweight electromagnetic radiation steering mechanism disclosed herein enables movement of the marking head during marking of a product. This advantageously increases the flexibility with which the marking head may be used. For example, the marking head may be attached to a robotic assembly configured to move the marking head and thereby maintain a desired distance from a curved product that is to be marked using the marking head.

According to a seventh aspect of the invention, there is provided a method of detecting electromagnetic radiation comprising receiving an electromagnetic radiation at a first optical element that is rotatable about a first rotational axis to change a first coordinate of a first steering axis in the two-dimensional field of view, directing the electromagnetic radiation to an electromagnetic radiation manipulator optically disposed between the first optical element and a second optical element, directing the electromagnetic radiation to the second optical element that is rotatable about a second rotational axis to change a second coordinate of a second steering axis in the two-dimensional field of view, defining a first angle between the first and second rotational axes, defining a second angle between the first and second steering axes, and using the electromagnetic radiation manipulator to introduce a difference between the first angle and the second angle.

The method may further comprise imaging an object using the electromagnetic radiation.

According to an eighth aspect of the invention, there is provided a method of assembling an electromagnetic radiation steering mechanism comprising mounting a first optical element and an associated first actuator that is configured to rotate the first optical element about a first rotational axis to change a first coordinate of a first steering axis in the two-dimensional field of view, mounting a second optical element having an associated second actuator that is configured to rotate the second optical element about a second rotational axis to change a second coordinate of a second steering axis in the two-dimensional field of view, and optically disposing an electromagnetic radiation manipulator between the first and second optical elements.

According to a ninth aspect of the invention, there is provided a method of retrofitting a production system comprising a continuous inkjet marking system comprising replacing the continuous inkjet marking system with the laser marking system of the second aspect of the invention.

The compact size and increased mobility of the laser marking system disclosed herein makes replacing a continuous inkjet marking system with the laser marking system far easier compared to known laser marking systems.

According to another aspect of the present invention, there is provided an electromagnetic radiation steering mechanism comprising a first rotational actuator coupled to a first reflective surface; a second rotational actuator coupled to a second reflective surface; and an electromagnetic radiation spatial distribution rotator optically disposed between said first reflective surface and said second reflective surface.

According to another aspect of the invention, there is provided an electromagnetic radiation steering mechanism comprising a first rotational actuator coupled to a first deflector; a second rotational actuator coupled to a second deflector; and an electromagnetic radiation spatial distribution rotator optically disposed between said first deflector and said second deflector.

According to another aspect of the invention, there is provided an electromagnetic radiation steering mechanism comprising a first variable deflector; a second variable deflector; and an electromagnetic radiation spatial distribution rotator optically operable between said first deflector and said second deflector.

According to another aspect of the invention, there is provided an electromagnetic radiation steering mechanism comprising a first variable deflector; a second variable deflector; and an electromagnetic radiation spatial distribution transformer disposed between said first deflector and said second deflector.

According to another aspect of the invention, there is provided an electromagnetic radiation steering mechanism comprising a first variable deflector; and a second variable deflector, in which the effective deflection axis of the first deflector is substantially orthogonally transformed.

According to another aspect of the invention, there is provided an electromagnetic radiation steering mechanism comprising a first variable deflector; and a second variable deflector, in which the first variable deflector directs the radiation in a linear manner on the second variable deflector and the second variable deflector further directs the radiation in an angular motion.

The first variable deflector may be a spatial distribution rotator.

The first variable deflector may be etched.

The first variable deflector may be a mirror.

The electromagnetic radiation may be a laser beam.

The electromagnetic radiation steering mechanism may be disposed in a housing having a skirt extending from an electromagnetic radiation output side of the housing, the skirt being configured and arranged to absorb electromagnetic radiation scattered from an object to which the electromagnetic radiation is directed by the mechanism.

The electromagnetic radiation steering mechanism may further comprise a cleaning subsystem including a source of air and an exhaust, the cleaning subsystem configured and arranged to remove particulate matter from about a surface of an object to which electromagnetic radiation is directed by the mechanism.

According to another aspect of the invention, there is provided an electromagnetic radiation steering mechanism comprising a first deflector; a second deflector; and an electromagnetic radiation spatial distribution rotator disposed between said first deflector and said second deflector.

At least one of the first deflector and the second deflector may be a variable deflector.

At least one of the first deflector and the second deflector may be a reflector.

At least one of the first deflector and the second deflector may be a mirror.

At least one of the first deflector and the second deflector may be refractive.

At least one of the first deflector and the second deflector may be a prism.

The electromagnetic radiation may be a laser beam.

The first deflector may include a first reflective surface and the first deflector may be coupled to a first actuator having an axis of rotation parallel to the first reflective surface.

The second deflector may include a second reflective surface and the second deflector may be coupled to a second actuator having an axis of rotation parallel to the second reflective surface and to the first reflective surface.

The first axis of rotation may be substantially parallel to the second axis of rotation.

The rotator may comprise at least two rotator deflectors positioned between said first reflective surface and said second reflective surface, wherein the combination of said rotator deflectors is configured and arranged to cause a substantially orthogonal transformation of spatial distribution of the electromagnetic radiation.

The rotator may comprise two orthogonal rotator deflectors.

The mechanism may comprise a two-axis optical scanner.

According to another aspect of the invention, there is provided a camera comprising the electromagnetic radiation steering mechanism discussed above.

According to another aspect of the invention, there is provided a product marker comprising the electromagnetic radiation steering mechanism discussed above.

The electromagnetic radiation steering mechanism may comprise a product marker.

According to another aspect of the invention, there is provided a method of steering electromagnetic radiation, the method comprising directing the electromagnetic radiation to a first variable deflector; and deflecting the electromagnetic radiation from the first variable deflector to a second variable deflector and through an electromagnetic radiation spatial distribution rotator disposed between said first variable deflector and said second variable deflector.

According to another aspect of the invention, there is provided a method of assembling an electromagnetic radiation steering mechanism, the method comprising mounting a first variable deflector within a housing; mounting a second variable deflector within the housing; and mounting an electromagnetic radiation spatial distribution rotator in the housing between said first variable deflector and said second variable deflector.

According to another aspect of the invention, there is provided a method of marking a product, the method comprising directing electromagnetic radiation to a first variable deflector in a housing of an electromagnetic radiation steering mechanism; deflecting the electromagnetic radiation from the first variable deflector to a second variable deflector and through an electromagnetic radiation spatial distribution rotator disposed between said first variable deflector and said second variable deflector; and deflecting the electromagnetic radiation from the second variable deflector to a surface of the product.

The method may further comprise receiving electromagnetic radiation from the surface of the product through an aperture in the housing of the electromagnetic radiation steering mechanism and onto the second variable deflector; deflecting the electromagnetic radiation from the second variable deflector to the first variable deflector and through the electromagnetic radiation spatial distribution rotator disposed between said first variable deflector and said second variable deflector; and directing the electromagnetic radiation from the first variable deflector to an electromagnetic radiation detector.

According to another aspect of the invention, there is provided a method of imaging an object, the method comprising receiving electromagnetic radiation from an object through an aperture in a housing of an electromagnetic radiation steering mechanism and onto a first variable deflector disposed within the housing; deflecting the electromagnetic radiation from the first variable deflector to a second variable deflector and through an electromagnetic radiation spatial distribution rotator disposed between said first variable deflector and said second variable deflector; and directing the electromagnetic radiation from the second variable deflector to an electromagnetic radiation detector.

According to another aspect of the invention, there is provided an optical scanner comprising a first drive mechanism having a first drive mechanism reflector; and a second drive mechanism having a second drive mechanism reflector, the second drive mechanism having an axis of rotation parallel to an axis of rotation of the first drive mechanism, the second drive mechanism positioned adjacent the first drive mechanism.

The optical scanner may further comprise a laser source configured to direct a laser beam into the optical scanner in a direction parallel to the axes of rotation of the first drive mechanism and the second drive mechanism.

The optical scanner may further comprise a first reflector positioned and arranged to receive the laser beam after being reflected by the first drive mechanism reflector, to alter an optical path of the laser beam reflected by the first drive mechanism reflector by 90 degrees.

The optical scanner may further comprise a second reflector positioned and arranged to receive the laser beam after being reflected by the first reflector, to alter the optical path of the laser beam reflected by the first reflector by an additional 90 degrees and to direct the laser beam toward the second drive mechanism reflector.

The optical scanner may further comprise a third reflector positioned and arranged to alter an optical path of the laser beam by 90 degrees and to reflect the laser beam from the laser source onto the first drive mechanism reflector.

The optical scanner may further comprise a fourth reflector positioned and arranged to receive the laser beam after being reflected by the second drive mechanism reflector and to alter the optical path of the laser beam by an additional 90 degrees and to direct the laser beam through an output aperture of the optical scanner.

The optical scanner may further comprise an electromagnetic energy sensor positioned and arranged to receive electromagnetic energy from an object external to the optical scanner and reflected from the first drive mechanism mirror and the second drive mechanism motor.

In accordance with one aspect, there is provided an optical scanner. The optical scanner comprises a first drive mechanism having a first drive mechanism mirror and a second drive mechanism having a second drive mechanism mirror. The second drive mechanism has an axis of rotation parallel to an axis of rotation of the first drive mechanism. The second drive mechanism is positioned adjacent the first drive mechanism.

In some embodiments, the optical scanner further comprises a laser source configured to direct a laser beam into the optical scanner in a direction parallel to the axes of rotation of the first drive mechanism and the second drive mechanism.

In some embodiments, the optical scanner further comprises a first mirror positioned and arranged to reflect the laser beam from the laser source onto the first drive mechanism mirror.

In some embodiments, the optical scanner further comprises a second mirror positioned and arranged to receive the laser beam after being reflected by the first drive mechanism mirror and to alter an optical path of the laser beam reflected by the first drive mechanism mirror by 90 degrees.

In some embodiments, the optical scanner further comprises a third mirror positioned and arranged to receive the laser beam after being reflected by the second mirror and to alter the optical path of the laser beam reflected by the second mirror by an additional 90 degrees and to direct the laser beam toward the second drive mechanism mirror.

In some embodiments, the optical scanner further comprises a fourth mirror positioned and arranged to receive the laser beam after being reflected by the second drive mechanism mirror and to alter the optical path of the laser beam by an additional 90 degrees and to direct the laser beam through an output aperture of the optical scanner.

It will, of course, be appreciated that features described in the context of one aspect of the invention may be combined with features described in the context of another aspect of the invention. For example, features described in the context of the assembly of the first aspect of the invention, or and of the second to ninth aspects of the invention may be combined with each other, and also with features of above described further aspects of the invention, and vice versa.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labelled in every drawing. Embodiments of the invention will now be described, by way of example only, with reference to the accompanying schematic drawings, in which.

DETAILED DESCRIPTION

Figure 1:
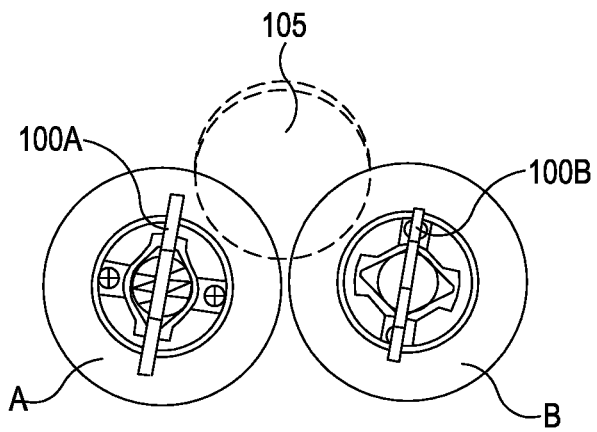
FIG. 1 is an elevational view of a pair of galvanometer motors and associated mirrors and a laser beam entering a laser scanner.

Aspects and embodiments disclosed herein are not limited to the details of construction and the arrangement of components set forth in the following description or illustrated in the drawings. Aspects and embodiments disclosed herein are capable of being practiced or of being carried out in various ways.

Aspects and embodiments disclosed herein include a system for scanning or steering the laser beam of a laser scanning or marking system and a laser scanning or marking system including such a system. Laser marking systems may be utilized in production lines for various types of articles. Laser marking systems may be utilized to imprint bar codes, unique identifying marks, expiration dates, or other information on items passing through a production line. In some implementations, carbon dioxide ($CO_2$) gas lasers may be used in laser marking systems. Carbon dioxide lasers produce beams of infrared light in four principal wavelength bands centering on 9.3, 9.6, 10.2, and 10.6 micrometers ($\mu m$). Lasers utilized in laser marking systems are typically operated at laser power levels in the tens of watts.

Laser scanning or marking systems are not, however limited to using $CO_2$ lasers. In some aspects and embodiments, optical scanners or markers may utilize lasers that operate in the ultraviolet, visible light, or near infrared wavelengths or any other type of laser or optical illumination source. The use of visible light laser beams in laser scanner systems may be advantageous in that a user can see the laser beam where it illuminates an object being scanned so the user can adjust the position of the laser scanner or object being scanned so that the laser illuminates a desired portion of the object.

Embodiments of laser scanners disclosed herein may include at least two mirror turning devices such as piezoelectric or magnet drives, direct current drives, stepper motors, servomotors, or galvanometers having mirrors attached. Subsequently the term "drive mechanism" will be used as a blanket term for the different mirror turning devices. The mirrors used in embodiments of the laser scanner/marker disclosed herein may be silver coated or gold coated mirrors or any other suitably coated material.

Windows and lenses used in embodiments of the laser scanner/marker disclosed herein may be, for example, germanium, zinc selenide, quartz, BK7 borosilicate glass, or any other suitable material.

Figure 2:
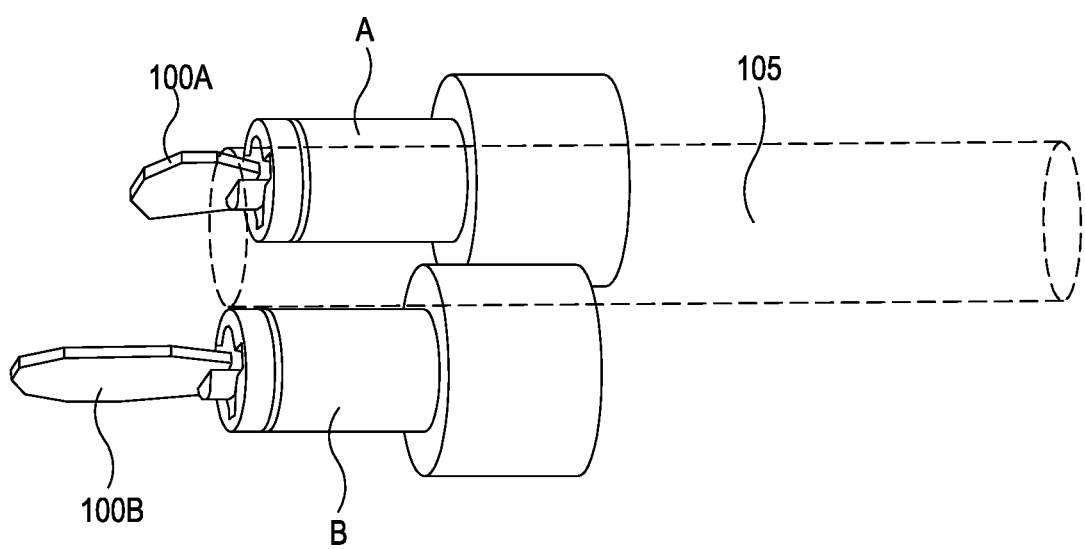
FIG. 2 is a side view of the pair of galvanometer motors and associated mirrors and laser beam of FIG. 1.

In accordance with some embodiments, both drive mechanisms of a laser scanning system are arranged with the rotational axis parallel to each other and parallel to the incoming laser beam at the same time. FIGS. 1 and 2 illustrate a front view and a side view, respectively, of a pair of drive mechanisms A, B and associated mirrors 100A, 100B of a scanning head of a laser scanning/marking system positioned relative to an incoming laser beam 105. The drive mechanisms A, B may be referred to as first and second actuators. The mirrors 100A, 100B may be considered to be examples of first and second optical elements of the electromagnetic radiation steering mechanism.

The two drive mechanisms A, B may be placed as closely as possible to each other (a minimal distance between the two rotation axes of the drive mechanisms). The closer the two drive mechanisms A, B may be placed, the smaller the mirror 100B of the second drive mechanism B may be. The two drive mechanisms A, B may be displaced on their rotation axes relative to each other.

Figure 3:
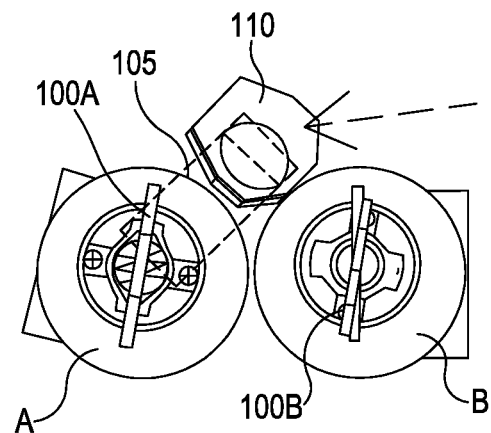
FIG. 3 is an elevational view of the pair of galvanometer motors and associated mirrors of FIG. 1 and a first mirror arranged to reflect the laser beam of FIG. 1 onto a first of the galvanometer motor mirrors.
Figure 4:
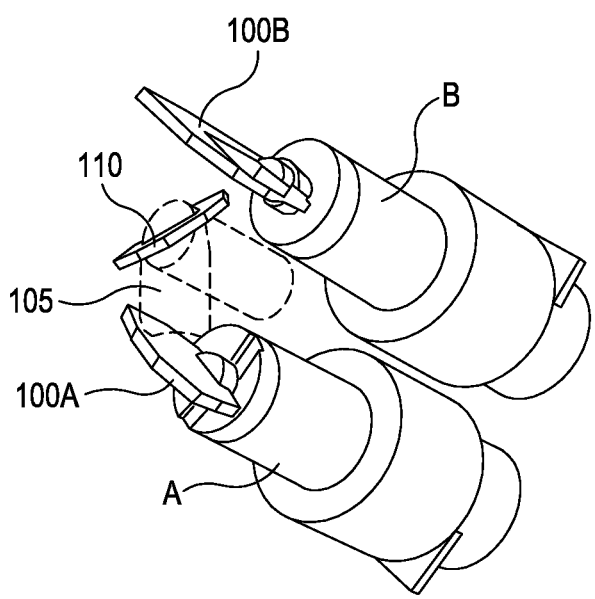
FIG. 4 is an isometric view of the pair of galvanometer motors and associated mirrors and first mirror of FIG. 3.

The incoming beam is turned by a mirror 110 (FIGS. 3 and 4) by 90° to hit the mirror 100A of the first drive mechanism A. In the example of FIGS. 3 and 4, the mirror 110 is arranged such that the incoming beam 105 is turned by the mirror 110 by about 90° when the incoming beam 105 enters the electromagnetic radiation steering mechanism parallel to the rotational axes of the two drive mechanisms A, B. Alternatively, the incoming beam 105 may enter the electromagnetic radiation steering mechanism perpendicular to the rotational axes of the two drive mechanisms A, B in which case, the mirror 110 may not be present.

In standard laser scanners the deflected beam would be directed to the second drive mechanism that is typically 90° oriented to the first drive mechanism. In some aspects and embodiments disclosed herein, however, the drive mechanisms A, B are parallel.

Figure 5:
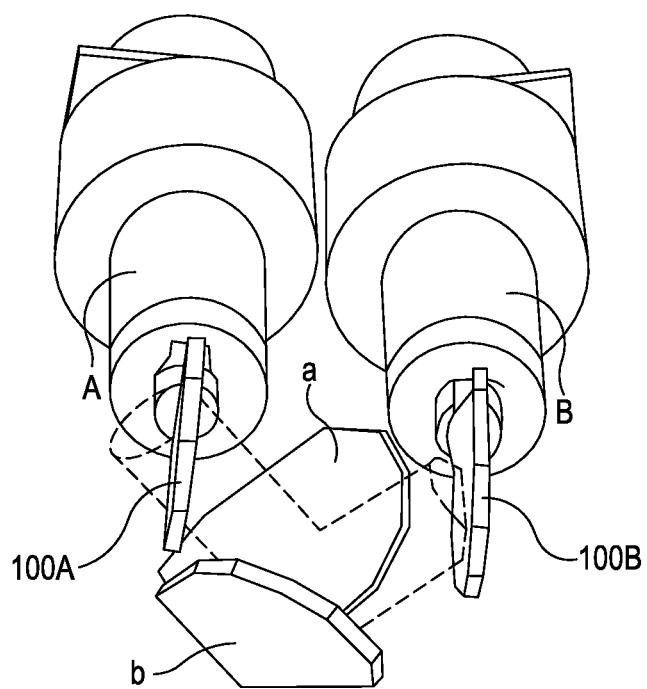
FIG. 5 is an isometric view of the pair of galvanometer motors and associated mirrors of FIG. 1 and a second and third mirror arranged to reflect the laser beam reflected by the first galvanometer mirror onto the second of the galvanometer motor mirrors.
Figure 6:
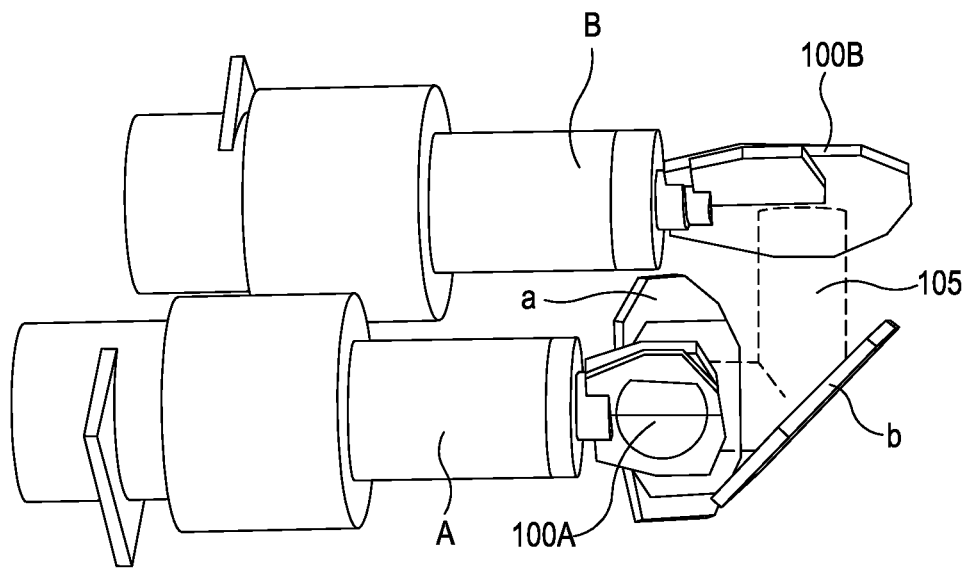
FIG. 6 is a side view of the pair of galvanometer motors and mirrors and the laser beam of FIG. 5.
Figure 7:
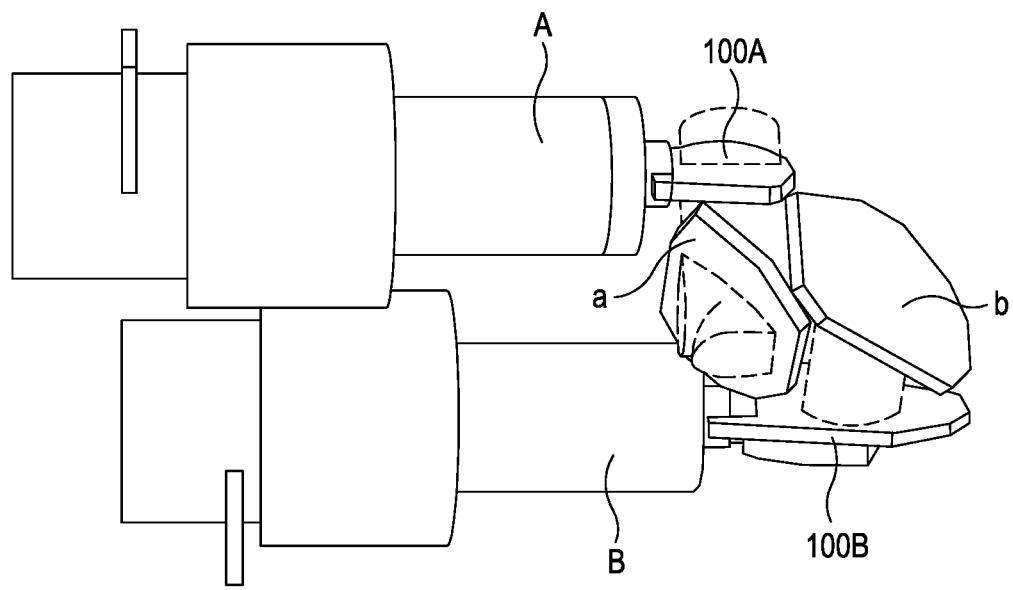
FIG. 7 is another side view of the pair of galvanometer motors and mirrors and the laser beam of FIG. 5.
Figure 8:
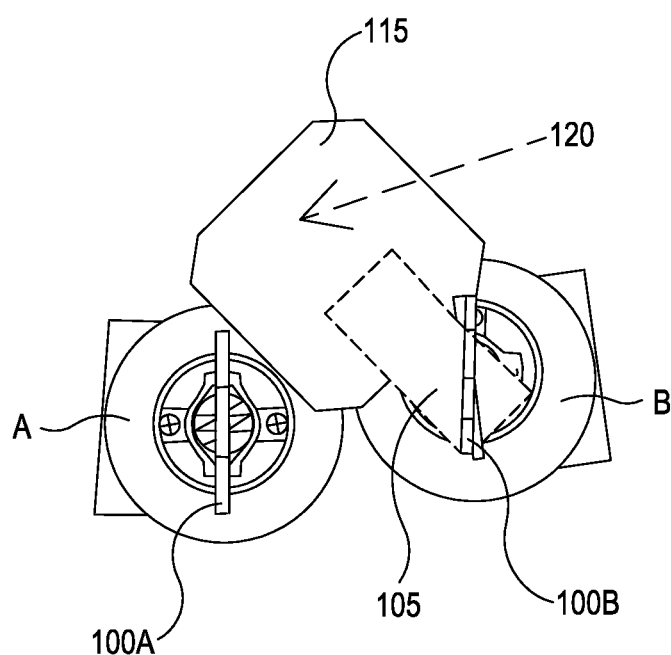
FIG. 8 is an elevational view of the pair of galvanometer motors and associated mirrors of FIG. 1 and a fourth mirror arranged to reflect the laser beam reflected by the second galvanometer mirror onto a workpiece.
Figure 9:
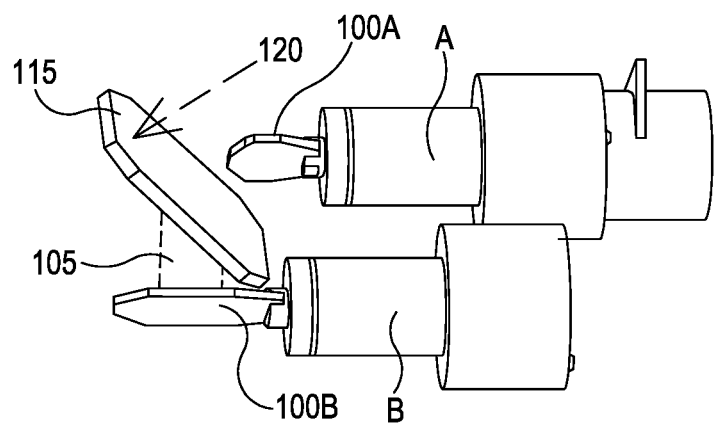
FIG. 9 is a side view of the pair of galvanometer motors and mirrors of FIG. 8.

As shown in FIGS. 5, 6, and 7, the deflected beam from drive mechanism A is directed to a fixed mirror "a" that deflects the beam scan direction by 90°. That is, in the example of FIGS. 5, 6 and 7, the first mirror "a" of the electromagnetic radiation manipulator is configured to change a propagation direction of the electromagnetic radiation within the electromagnetic radiation steering mechanism by 90°. The deflected beam from mirror "a" is directed to a second fixed mirror "b," which deflects the beam scan direction by 90°. From there the deflected beam hits the moving mirror 100B of drive mechanism B. That is, in the example of FIGS. 5, 6 and 7, the second mirror "b" of the electromagnetic radiation manipulator is configured to change a propagation direction of the electromagnetic radiation within the electromagnetic radiation steering mechanism by another 90°. In total, the electromagnetic radiation manipulator "a", "b" causes the electromagnetic radiation 105 to change propagation direction twice within the electromagnetic radiation steering mechanism by about 90°. The first 90° change in propagation direction takes place about a first plane defined by an orientation of a reflective surface of the first mirror "a" with respect to the electromagnetic radiation 105. The first plane may be substantially in alignment with a first reflective axis of the first mirror "a". The second 90° change in propagation direction takes place about a perpendicular plane defined by an orientation of the reflective surface of the second mirror "b" with respect to the electromagnetic radiation 105. The perpendicular plane may be substantially in alignment with a second reflective axis of the second mirror "b". The two 90° changes in propagation direction caused by the electromagnetic manipulator "a", "b" may take place about two different (e.g. perpendicular) axes in three-dimensional space. The electromagnetic radiation manipulator "a", "b" advantageously allows parallel optical elements 100A, 100B to be used to steer the electromagnetic radiation 105 about a two dimensional field of view (e.g. a two dimensional field of view having orthogonal steering axes). The effect of the electromagnetic radiation manipulator "a", "b" on the electromagnetic radiation 105 is shown and discussed further with reference to FIG. 15.

This arrangement of two fixed turning mirrors "a," "b" achieves a 90° turn of the deflection degree of freedom of the first galvanometer motor A prior to the beam hitting the second galvanometer motor B. That is, rotating the first optical element 100A about a first rotational axis results in a steering movement of the electromagnetic radiation exiting the electromagnetic radiation steering mechanism that is substantially perpendicular to the orientation of the first rotational axis. In other words, the electromagnetic radiation manipulator "a", "b" disclosed herein advantageously decouples the orientations of the first and second rotational axes of the first and second optical elements 100A, 100B from the orientations of the first and second steering axes of the electromagnetic radiation steering mechanism, thereby allowing for greater design freedom and a broader range of applications.

Finally, after the second deflection degree of freedom is added by the drive mechanism B the deflected beam 105 is turned by a mirror 115 by 90° again to face a product (in the direction of arrow 120 in FIGS. 8, 9, 12, and 13).

Figure 10:
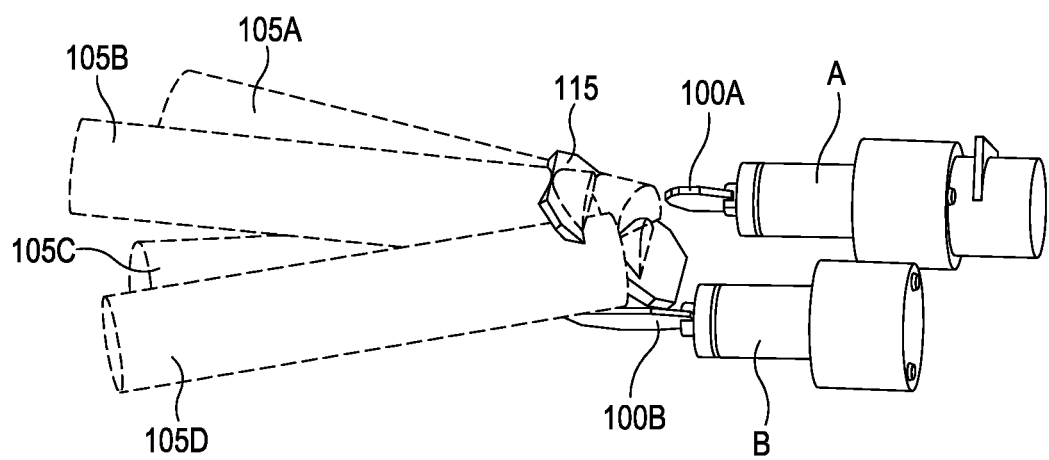
FIG. 10 illustrates a range of laser beam deflection achievable with the laser scanner.
Figure 11:
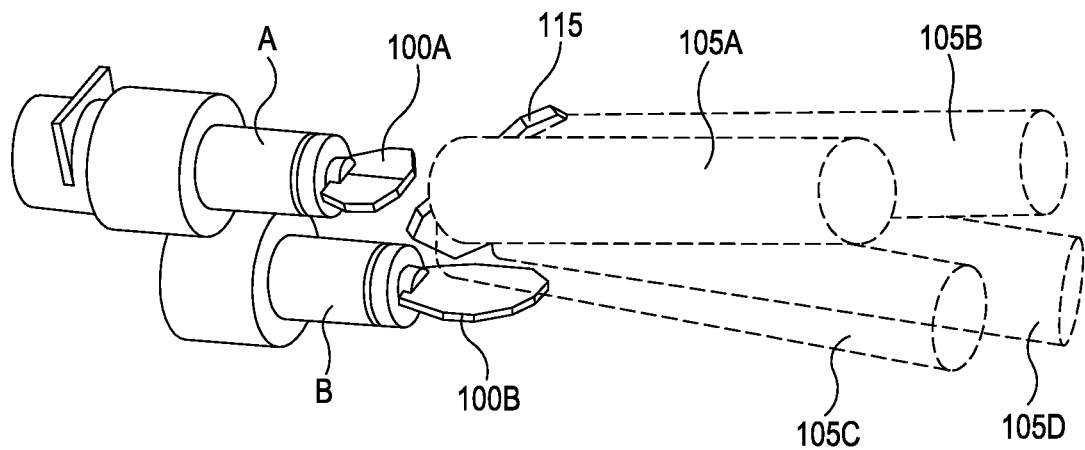
FIG. 11 illustrates a range of laser beam deflection achievable with the laser 20 scanner.
Figure 12:
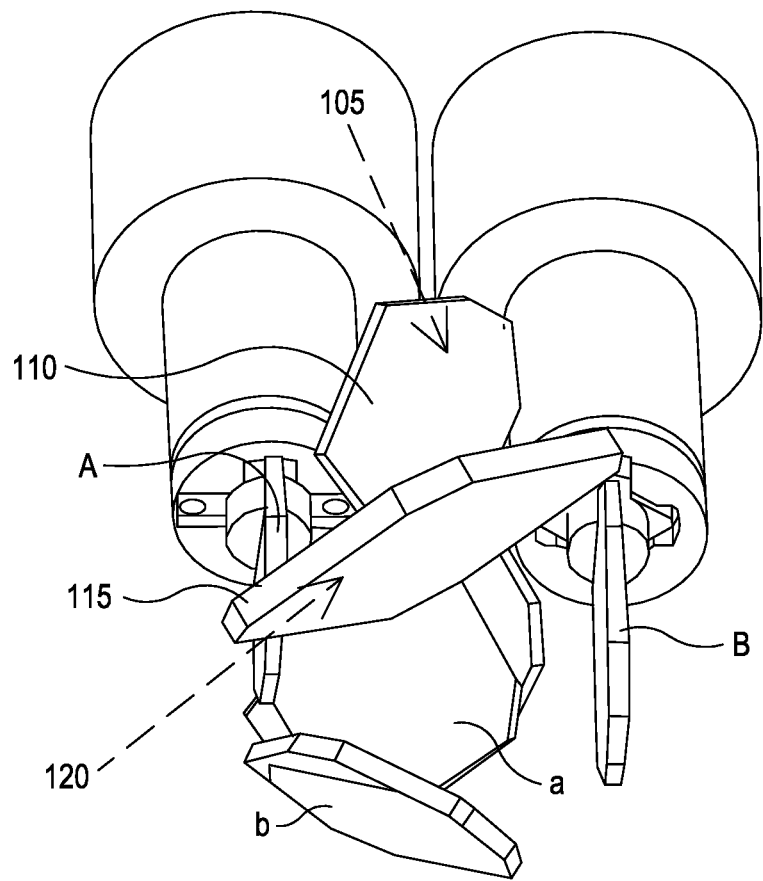
FIG. 12 is an isometric view of the pair of galvanometer motors and associated mirrors of FIG. 1 and the first through fourth mirrors.
Figure 13:
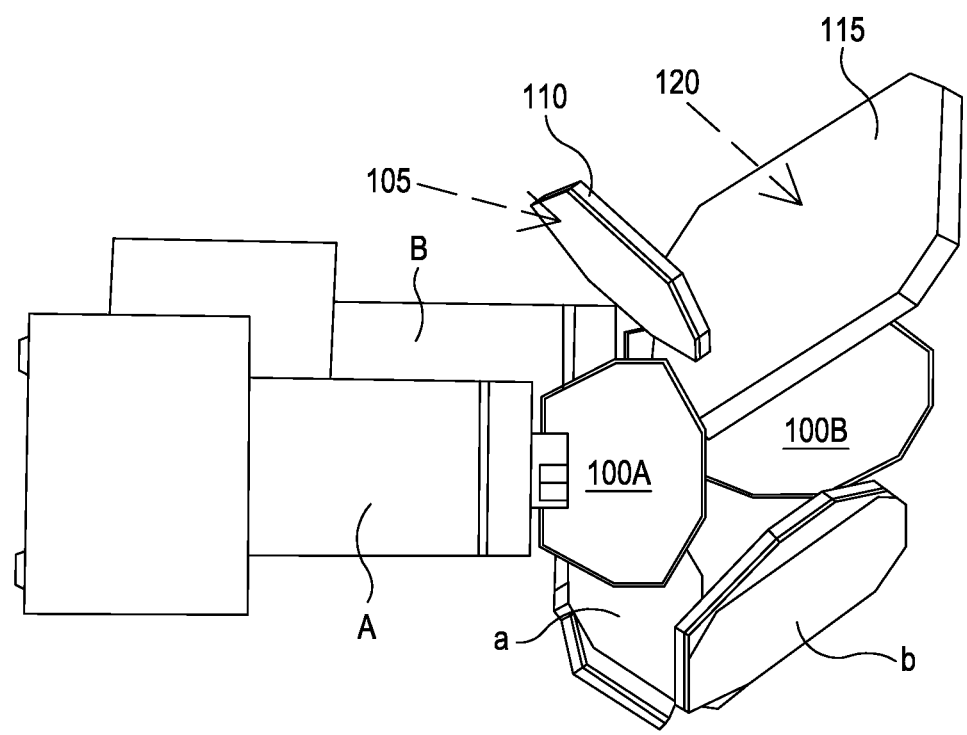
FIG. 13 is a side view of the pair of galvanometer motors and associated mirrors of FIG. 1 and the first through fourth mirrors.

The two orthogonal degrees of freedom for the beam deflection are shown by the sample rays 105A, 105B, 105C, and 105D in FIGS. 10 and 11 after the final 90° turn. That is, the electromagnetic radiation 105 may be steered between the positions shown by sample rays 105A-D in FIGS. 10 and 11. The sample rays 105A-D demonstrate the maximum extent of the two dimensional field of view about which the electromagnetic radiation may be steered by the electromagnetic radiation steering mechanism.

Figure 14:
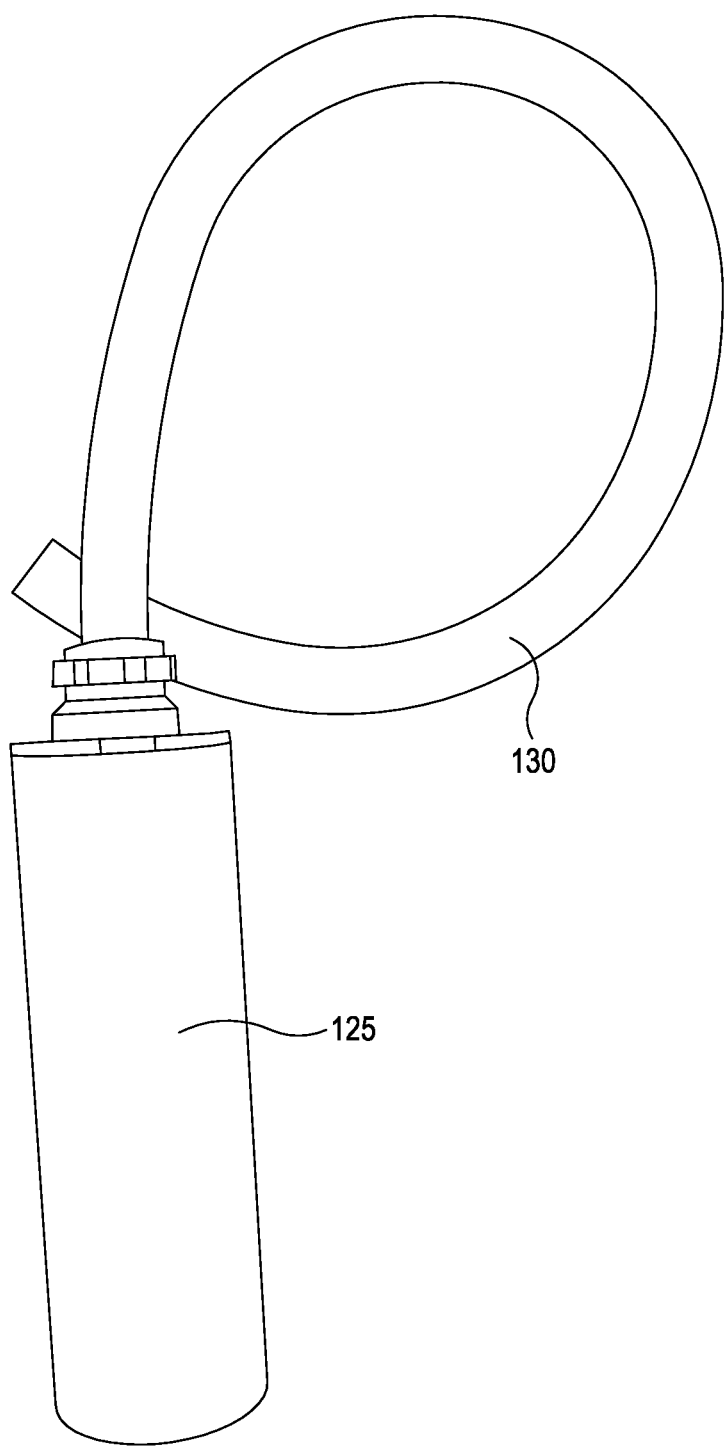
FIG. 14 illustrates a casing for the laser scanner (i.e. a casing for the electromagnetic radiation steering mechanism)

The entire assembly including the drive mechanisms A, B and all associated mirrors may be disposed within a cylindrical housing 125, such as that illustrated in FIG. 14. The cylindrical housing 125 may have a diameter of about 40 mm and a length of about 350 mm. The cylindrical housing 125 may also include, for example, a 300 mm long isolator and a 50 mm long beam generator, which would bring a total length of the cylindrical housing 125 to about 700 mm. The cylindrical housing 125 may have substantially similar dimensions as the marking head of a model 1860 continuous inkjet printer available from Videojet Technologies Inc., Wood Dale, Ill. A flexible umbilical cord 130 may be coupled to the housing 125 and may include power and signal lines to provide power to and control the drive mechanisms A, B. The umbilical cord 130 may also include a light waveguide, for example, a fiber optic cable to carry a laser beam from an external laser beam generator into the housing 125. Alternatively, a laser beam generator may be disposed within the housing 125 with the other components. The cylindrical housing 125 and enclosed components may form a marking head or a scanning head for a laser marking system or an optical scanning system. A lower end of the housing 125 may be sealed by an optically transparent window to keep debris from entering the housing 125.

In some embodiments, the cylindrical housing 125 may further include a skirt (not shown) extending from a lower end of the cylindrical housing 125. The skirt may be referred to as a radiation shield. In use as a laser marker or optical scanner, the cylindrical housing 125 may be brought into proximity of a surface of an object to be scanned or marked. The skirt may extend from the lower end of the cylindrical housing 125 and be placed against or close to the surface of the object. The skirt may prevent light (e.g., laser light) from reflecting off of the surface of the object toward the eyes of a user or bystander while the object is scanned or marked by blocking light that is reflected from the surface of the object. A flange or labyrinthine projection or collar extending radially outward from a lower end of the skirt may be used to further prevent light from scattering from inside the skirt. One or more photosensors may be provided on or proximate the skirt to determine if light is not being adequately blocked by the skirt. The small form factor of embodiments of the laser marking head disclosed herein may provide for the laser marking head to be disposed very close to an object being marked, for example, less than about 10 mm from the object being marked. The skirt may thus extend less than about 10 mm from the end of the housing 125. The provision of the skirt on the housing 125 of the laser marking head may reduce or eliminate the need for large and bulky shields that are typically placed around existing laser marking systems to prevent laser light from reaching an operator or bystander.

An air circulation system may be included in the skirt to remove any particulate matter emitted from the surface of the object while the object is laser marked. The air circulation system may comprise an extraction device fluidly coupled to the radiation shield via an integrated extraction inlet. In some embodiments, air from a fan may be directed to an object being marked from one portion of the skirt and a vacuum may be applied to another portion of the skirt to form an "air knife" and integrated exhaust for removing particulates as a result of an object being marked. A lower end of the skirt may include a brush to assist in removing debris from the surface of the object. In some embodiments, the skirt may be formed of a flexible material that may be expandable or contractable by adding or removing air or another fluid to an internal volume of the skirt.

The skirt may be a consumable that is removably attached to the housing 125 of a laser marking system head. The skirt may thus be replaced on a periodic basis or upon becoming damaged or after accumulating more debris than desirable in a filter, for example, an electrostatic filter, included in the skirt. In some embodiments the skirt may include an RFID chip or other safety interlock that the laser marking system uses to determine if the skirt is attached to the housing 125 and to prevent use of the system without the skirt present.

Aspects and embodiments of the laser scanner/marker system disclosed herein may provide advantages not realized in existing systems. In existing systems the first and second drive mechanisms are typically oriented at 90° relative to one another. This makes existing laser scanner/marker systems bulkier and thus more limited in positioning capabilities in a production system than the aspects and embodiments disclosed herein. In some examples, existing laser marking heads weigh over five kilograms. In contrast, a laser marking head as disclosed herein may weigh about 0.5 kg, about one tenth the weight of many existing systems. The form factor, size, and weight of aspects and embodiments of the laser scanner/marker system disclosed herein provide for the disclosed laser scanner/marker system to be more easily manipulated. For example, the marking head of the laser scanner/marker system including the housing 125 may be mounted on a movable assembly such as a robot arm and may be moved to follow the contours of a three dimensional object such as a bottle while retaining the same focal distance, for example, about 5 mm from the surface of the object. The ability to move the marking head of the laser scanner/marker system relative to objects being marked may eliminate the need for a stage of a system through which the objects pass to be moveable, thus reducing the mechanical complexity of the system as compared to some existing systems.

Aspects and embodiments of the laser scanner/marker system disclosed herein may be mounted in production systems where existing laser scanner/marker systems could not. The cylindrical shape of the housing 125 may provide for the housing 125 to be more easily clamped in place onto a piece of manufacturing equipment than housings with rectangular cross sections. The flexible umbilical cord makes the housing containing the drive mechanisms and associated mirrors separable from bulky laser generating equipment, further increasing the flexibility of mounting of the disclosed laser scanner/marker systems. In some instances, for example, a laser marking head including the housing 125 may be retrofit into a system that previously utilized a continuous inkjet marking head of similar dimensions. Retrofitting a system to include a laser marking head instead of a continuous inkjet marking head may reduce the cost of ownership of the system by, for example, eliminating the need to purchase ink consumables over the life of the system. Further, a laser marking system may operate more quickly than continuous inkjet system for marking numbers or two-dimensional codes onto objects and so retrofitting a marking system by replacing a continuous inkjet marking head with a laser marking system including a laser marking head as disclosed herein may improve the operating speed and throughput of the marking system.

In additional embodiments, rather than outputting a laser beam, the system disclosed herein may be utilized to receive an optical signal from a direction defined by positions of the mirrors 100A and 100B. For example, instead of being used to direct light out of a housing 125 containing the drive mechanisms A, B and associated mirrors, mirror 115 may be utilized to receive an optical signal from outside of the housing 125 though an aperture in the housing 125. The light may be directed from mirror 115 to mirror 100A, then mirror "b", then mirror "a", then mirror 100A, then mirror 110 and up an interior of the housing 125 and/or through an optical waveguide onto an optical sensor, for example, included in a camera. Alternatively, mirror 100A may be formed of a material that is transparent or translucent to an optical frequency of interest and a camera chip may be disposed on a rear of mirror 100A to receive the optical signal from mirror "a."

Example

A laser marking head was built as a functional prototype using CTI and Citizen galvanometers and a 630 nm red laser beam source, forming a cylindrical marking head of approximately 40 mm in diameter.

Figure 15:
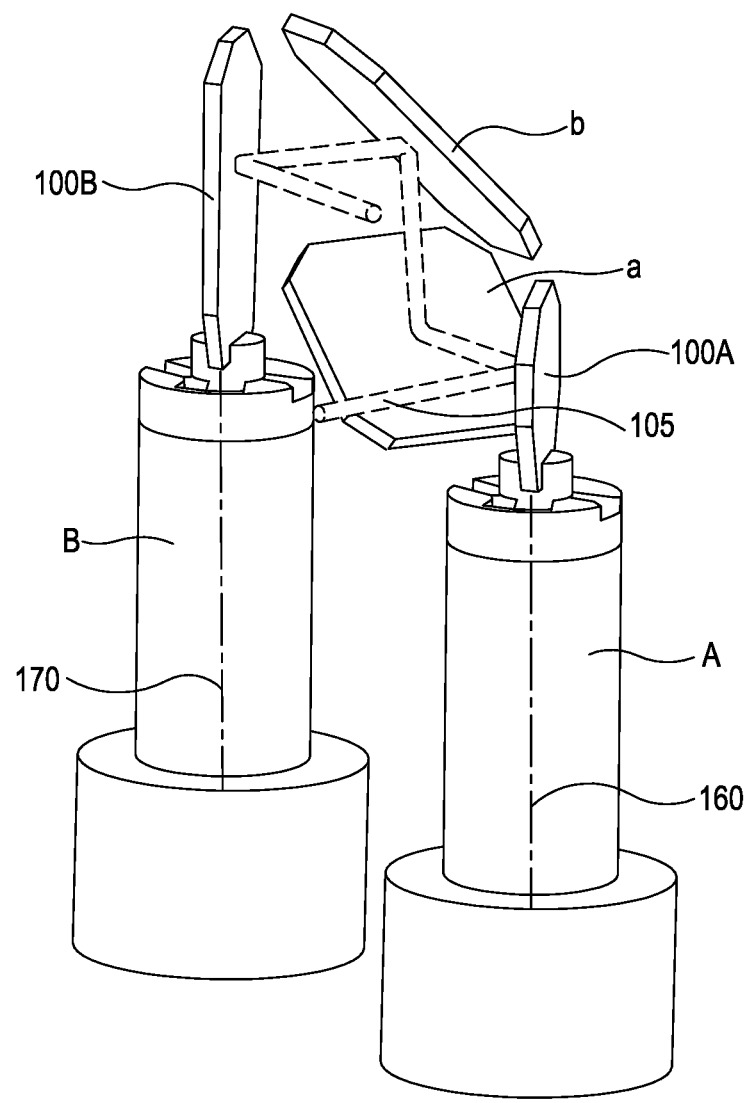
FIG. 15 is a side view of an electromagnetic radiation steering mechanism comprising an electromagnetic radiation manipulator according to an embodiment of the invention.

FIG. 15 shows a side view of an electromagnetic radiation steering mechanism comprising an electromagnetic radiation manipulator "a", "b" according to an embodiment of the invention. The electromagnetic radiation steering mechanism comprises a first optical element 100A having an associated first actuator A configured to rotate the first optical element 100A about a first rotational axis 160 to change a first coordinate of a first steering axis in the two-dimensional field of view (e.g. the limits of steering movement of the sample rays 105A-D shown in FIG. 10 and FIG. 11). The electromagnetic radiation steering mechanism further comprises a second optical element 100B having an associated second actuator B configured to rotate the second optical element 100B about a second rotational axis 170 to change a second coordinate of a second steering axis in the two-dimensional field of view 105A-D (e.g. the limits of steering movement of the sample rays 105A-D shown in FIG. 10 and FIG. 11). In the example of FIG. 15, the first optical element 100A is adjacent the second optical element 100B. In the example of FIG. 15, the first optical element 100A is offset from the second optical element 100B along an axis that is substantially parallel to the first and second rotational axes 160, 170. In the example of FIG. 15, the first optical element 100A comprises a first reflective surface configured to receive and reflect electromagnetic radiation 105 and the second optical element 100B comprises a second reflective surface configured to receive and reflect the electromagnetic radiation 105. In the example of FIG. 15, the first rotational axis 160 and the first reflective surface are substantially parallel, and the second rotational axis 170 and the second reflective surface are substantially parallel.

The electromagnetic radiation steering mechanism further comprises an electromagnetic radiation manipulator "a", "b" optically disposed between the first and second optical elements 100A, 100B. The first optical element 100A is configured to receive electromagnetic radiation 105 and direct the electromagnetic radiation 105 to the electromagnetic radiation manipulator "a", "b". The electromagnetic radiation manipulator "a", "b" is configured to direct the electromagnetic radiation 105 to the second optical element 100B. The second optical element 100B may be configured to direct the electromagnetic radiation 105 to an optical output of the electromagnetic radiation steering mechanism. The second optical element 100B may, for example, be configured to direct the electromagnetic radiation 105 to an optical input of an optical device (not shown) configured to receive the steered electromagnetic radiation, such as a camera.

In the example of FIG. 15, the electromagnetic radiation manipulator comprises a first mirror "a" and a second mirror "b". The first mirror "a" is configured to receive the electromagnetic radiation 105 after the electromagnetic radiation 105 has interacted with the first optical element 100A and direct the electromagnetic radiation 105 to the second mirror "b". The second mirror "b" is configured to receive the electromagnetic radiation 105 after the electromagnetic radiation 105 has interacted with the first mirror "a" and direct the electromagnetic radiation 105 to the second optical element 100B. The first mirror "a" and the second mirror "b" are fixed with respect to each other.

The first mirror "a" is arranged so as to apply about a 90° change in a propagation direction of the electromagnetic radiation 105. To achieve this, the first mirror "a" may be optically disposed at a 45° angle with respect to incident electromagnetic radiation 105. The second mirror "b" is arranged so as to apply about a 90° change in a propagation direction of the electromagnetic radiation 105. To achieve this, the second mirror "b" may be optically disposed at a 45° angle with respect to incident electromagnetic radiation 105. These changes in the propagation direction of the electromagnetic radiation 105 enable the two orthogonal degrees of freedom for the beam deflection as shown by the sample rays 105A, 105B, 105C, and 105D in FIGS. 10 and 11.

A first angle is defined between the first and second rotational axes 160, 170 and a second angle is defined between the first and second steering axes. The electromagnetic radiation manipulator "a", "b" is configured to introduce a difference between the first angle and the second angle. In the example of FIG. 15, the first rotational axis 160 and the second rotational axis 170 are non-orthogonal. In the example of FIG. 15, the first rotational axis 160 and the second rotational axis 170 are substantially parallel. In the example of FIG. 15, the first steering axis and the second steering axis are substantially orthogonal. That is, in the example of FIG. 15, the electromagnetic radiation manipulator "a", "b" is configured to introduce a difference of about 90° between the first angle and the second angle.

Figure 16:
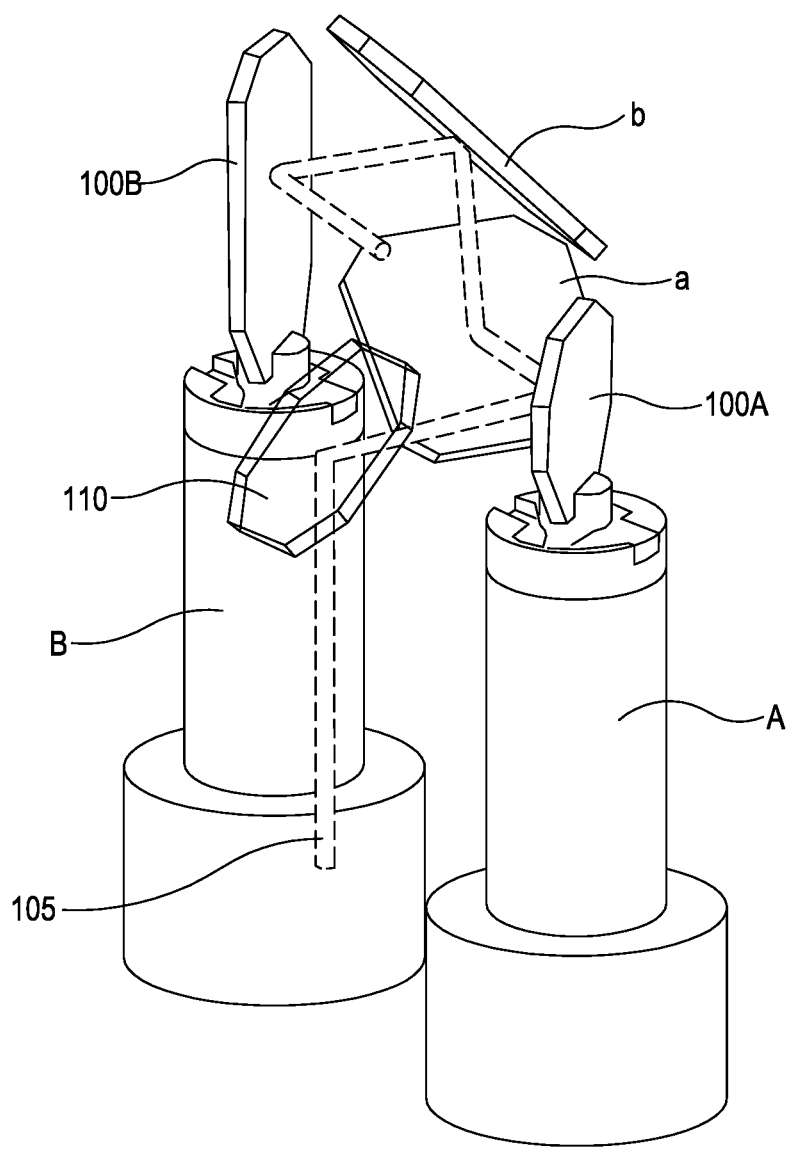
FIG. 16 is a side view of the electromagnetic radiation steering mechanism of FIG. 15 further comprising a third reflector according to an embodiment of the invention.

FIG. 16 shows a side view of the electromagnetic radiation steering mechanism of FIG. 15 further comprising a third reflector 110 according to an embodiment of the invention. The electromagnetic radiation 105 is turned by the third reflector 110 by 90° to hit the first optical element 100A of the first actuator A. This is useful in the formation of a coaxial device in which the electromagnetic radiation 105 generally propagates in a direction parallel to the first and second axes of rotation of the first and second optical elements 100A, 100B (e.g. when the electromagnetic radiation enters and exits the electromagnetic radiation steering mechanism). It will be appreciated that at various positions within the electromagnetic radiation steering mechanism the electromagnetic radiation propagates in a direction that is not along an axis parallel to the first and second axes of rotation. However, the electromagnetic radiation manipulator advantageously enables the first and second rotational axes to be parallel with one another, and as discussed in greater detail below with reference to FIG. 16 and FIG. 17, further optical elements such as reflectors may be introduced to allow electromagnetic radiation to enter and exit the electromagnetic radiation steering mechanism along an axis parallel to the first and second rotational axes.

Figure 17:
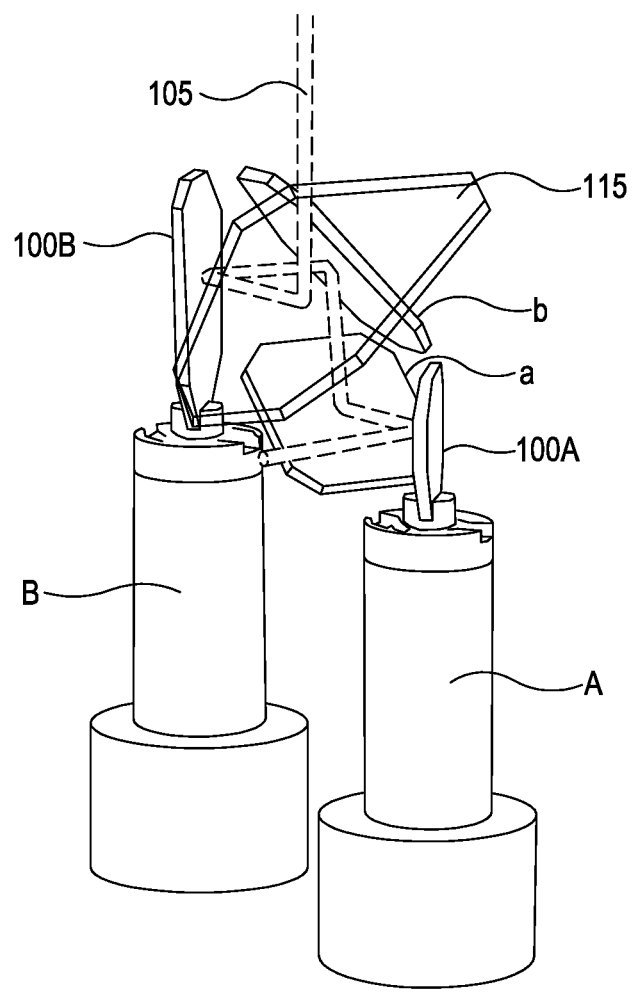
FIG. 17 is a side view of the electromagnetic radiation steering mechanism of FIG. 15 further comprising a fourth reflector according to an embodiment of the invention.

FIG. 17 shows a side view of the electromagnetic radiation steering mechanism of FIG. 15 further comprising a fourth reflector 115 according to an embodiment of the invention. After the electromagnetic radiation 105 has reflected from the second optical element 100B, the electromagnetic radiation 105 is turned by the fourth reflector 115 by 90°. The electromagnetic radiation 105 may then exit the electromagnetic radiation steering mechanism and be incident upon an object such as a product that is to be marked by the electromagnetic radiation 105.

Figure 18:
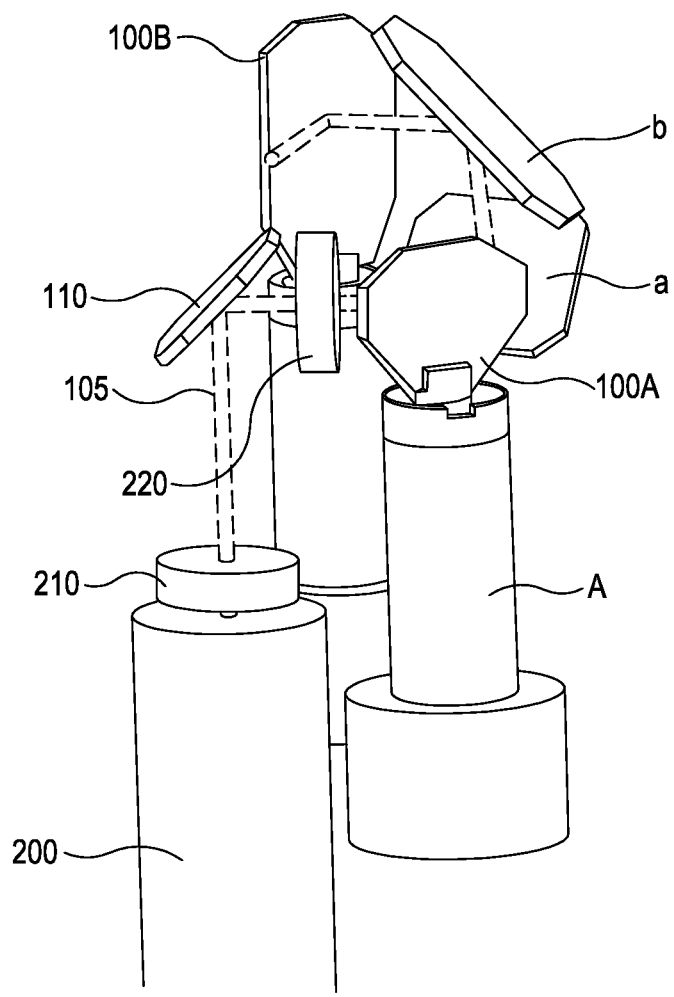
FIG. 18 is a side view of the electromagnetic radiation steering mechanism of FIG. 16 further comprising a collimator and focusing optics according to an embodiment of the invention.

FIG. 18 shows a side view of the electromagnetic radiation steering mechanism of FIG. 16 further comprising a collimator 200 and focusing optics 210, 220 according to an embodiment of the invention. The collimator 200 may be configured to receive electromagnetic radiation 105 from a radiation source or optical fibre (not shown) and provide a beam of electromagnetic radiation 105 having substantially parallel rays. The focussing optics 210, 220 may be configured to receive electromagnetic radiation 105 provided by the collimator 200 and condition the electromagnetic radiation 105 in a desired way, e.g. to ensure the electromagnetic radiation 105 fits on to the first and second optical elements 100A, 100B.

Figure 19:
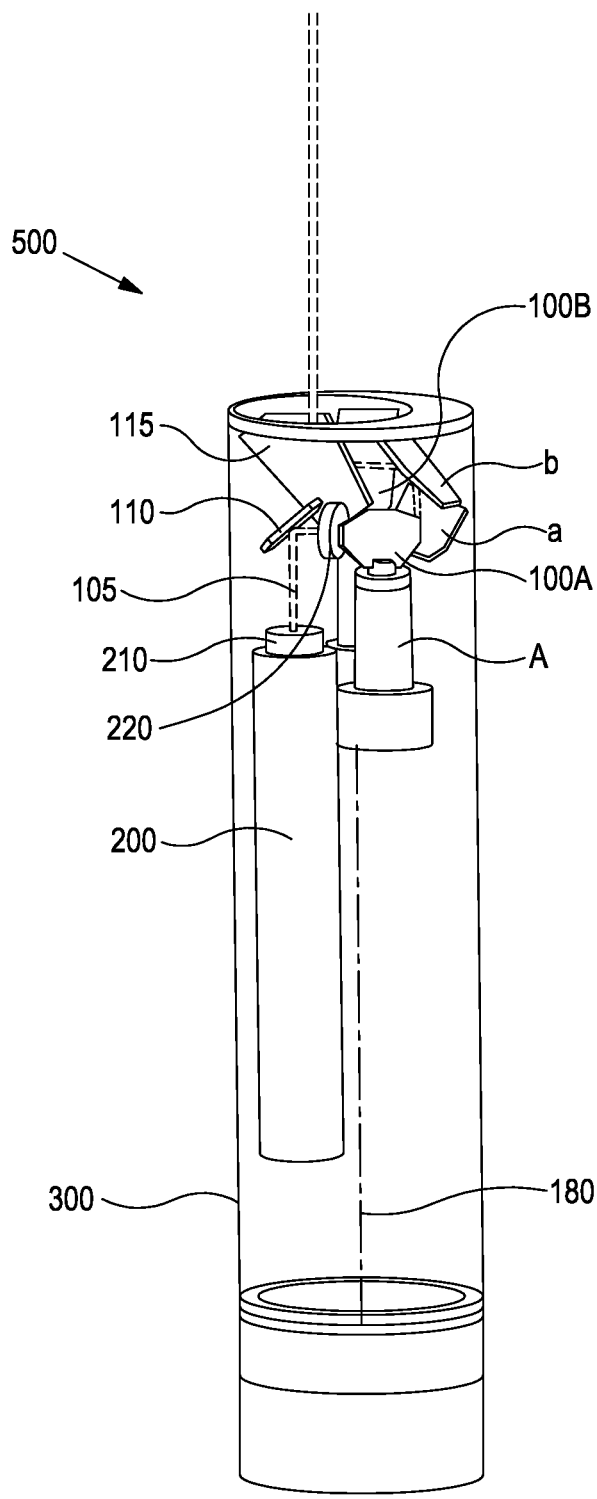
FIG. 19 is a side view of a marking head of a laser marking system comprising the electromagnetic radiation steering mechanism according to an embodiment of the invention.

FIG. 19 shows a side view of a marking head 500 of a laser marking system comprising the electromagnetic radiation steering mechanism according to an embodiment of the invention. The marking head 500 comprises a cylindrical housing 300. The cylindrical housing 300 may, for example, have a diameter of about 40 mm and a length of about 350 mm. The cylindrical housing 300 may have substantially similar dimensions as the marking head of a model 1860 continuous inkjet printer available from Videojet Technologies Inc., Wood Dale, Ill. The marking head 500 may, for example, have a weight of about 0.5 kg or less.

The first rotational axis and the second rotational axes are substantially parallel and the electromagnetic radiation steering mechanism is installed substantially parallel to a length of the marking head 500 of the laser marking system such that an axis 180 of the marking head 500 that is parallel to the length (i.e. the greatest of three dimensions) of the marking head 500 is substantially parallel to the first and second axes of rotation of the first and second optical elements 100A, 100B.

Figure 20:
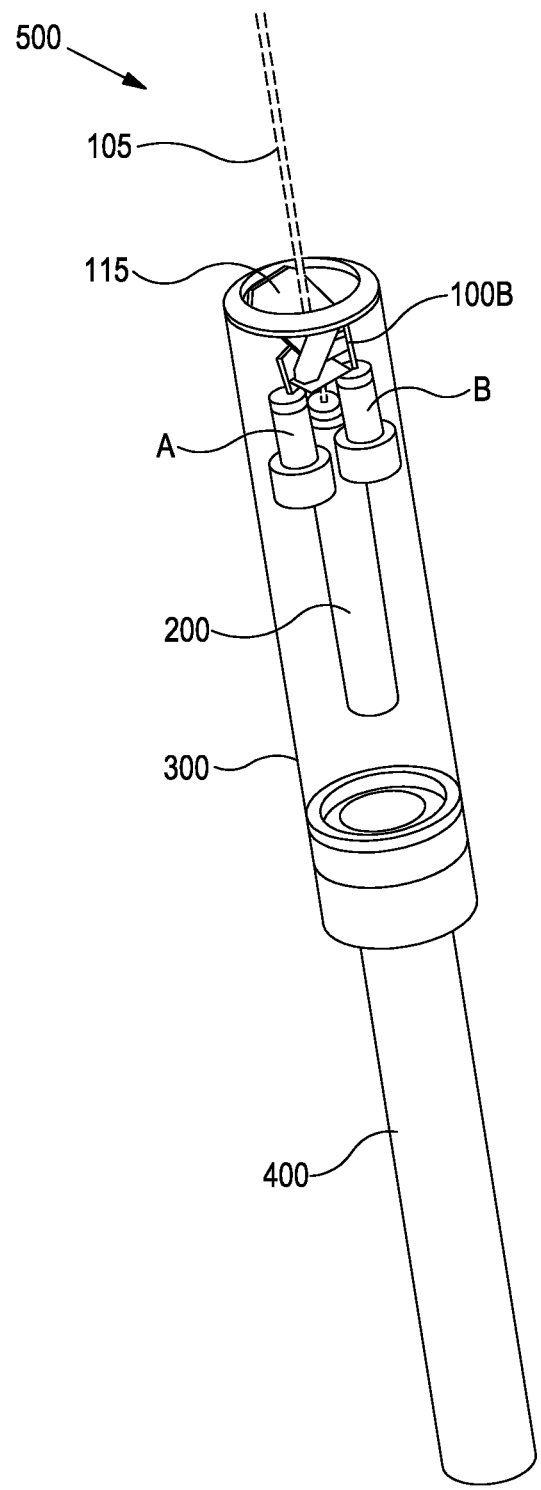
FIG. 20 is a side view of the marking head of FIG. 19 further comprising an umbilical according to an embodiment of the invention; and, FIGS. 21A and 21B show an embodiment of a variable optical path length device in a plan view and a perspective view, respectively.

FIG. 20 is a side view of the marking head 500 of FIG. 19 further comprising a flexible umbilical 400 according to an embodiment of the invention. The flexible umbilical 400 is configured to connect to the marking head 500 and transmit power and/or control signals to the marking head 500 from another object such as a controller. The flexible umbilical 400 may advantageously allow easy movement of the marking head 500 thereby further increasing the range of applications and installation environments in which the marking head 500 may be used.

For example, the electromagnetic radiation 105 may have a beam diameter of about 2.5 mm when leaving the flexible umbilical 400 and entering the electromagnetic radiation steering mechanism. The marking head 500 may, for example be capable of marking products with about 1700 characters per second. The characters may have a height of about 2 mm. When used for marking a product, the electromagnetic radiation 105 exiting the marking head 500 may have a beam diameter of between about 200 µm and about 300 µm. When used for engraving a product, the electromagnetic radiation 105 exiting the marking head 500 may have a beam diameter of between about 10 µm and about 15 µm.

Electromagnetic radiation 105 may be provided to the umbilical assembly 400 by a radiation source such as, for example, a $CO_2$ laser or a diode laser. The umbilical assembly 400 may be connected to the housing 300 of the marking head 500. An optical fibre of the umbilical assembly 400 may direct the radiation 105 to the collimator 200 in the marking head 500. The collimator 200 may condition the radiation 105 in a desired manner before directing the radiation 105 to focussing optics 210 for further conditioning as desired. The radiation 105 may then be incident on the third reflector 110 which is configured to reflect the radiation 105 and thereby change a propagation direction of the radiation 105 by 90° towards the first optical element 100A. The first optical element 100A may reflect the radiation towards the first mirror "a" of the electromagnetic radiation manipulator. The first mirror "a" may reflect the radiation 105 and thereby change a propagation direction of the radiation 105 by 90° towards the second mirror "b" of the electromagnetic radiation manipulator. The second mirror "b" may reflect the radiation 105 and thereby change a propagation direction of the radiation 105 by 90° towards the second optical element 100B. The second optical element 100B may reflect the radiation towards the fourth reflector 115. The fourth reflector 115 may reflect the radiation 105 and thereby change a propagation direction of the radiation 105 by 90° towards an output of the marking head 500.

The electromagnetic radiation manipulator "a", "b" enables parallel optical elements 100A, 100B to steer the radiation in non-parallel (e.g. perpendicular) axes. Having parallel optical elements 100A, 100B (and associated actuators A, B) allows the electromagnetic radiation steering mechanism to be installed within the marking head 500 such that both rotational axes of the first and second optical elements are parallel with a length or primary axis 180 of the marking head 500. This greatly reduces the size and weight of the marking head 500 with respect to known marking heads. The marking head 500 described herein may therefore be installed more easily and allow greater flexibility of use (e.g. movement during marking and/or locating the marking head in a small space) compared to known marking heads.

Figure 21A:
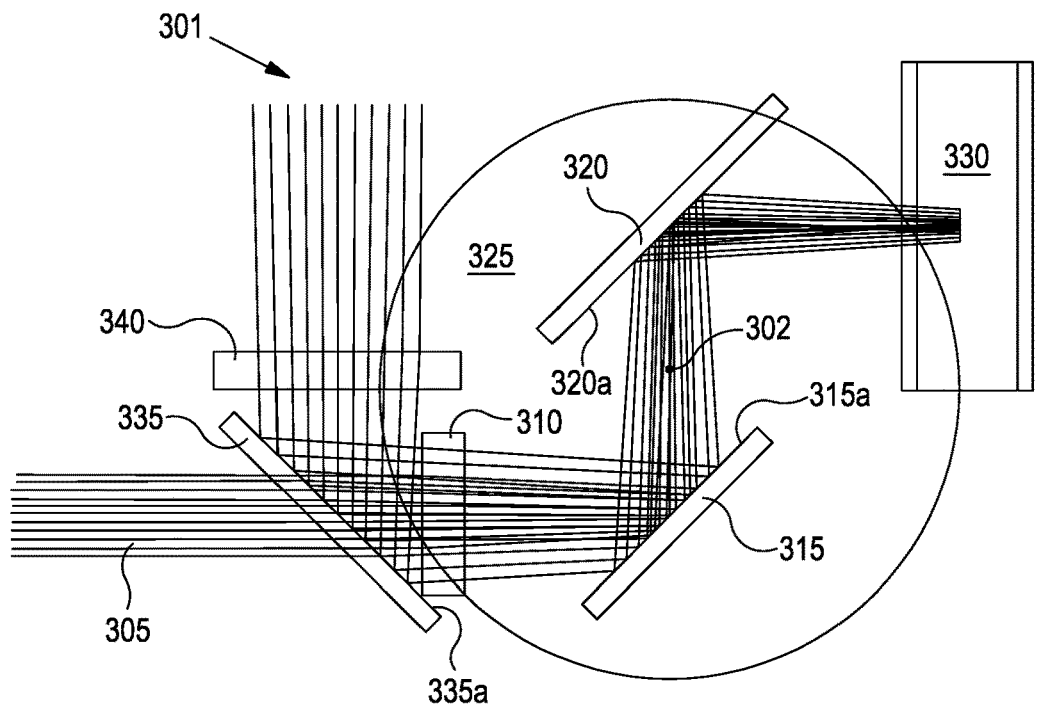
Figure 21B:
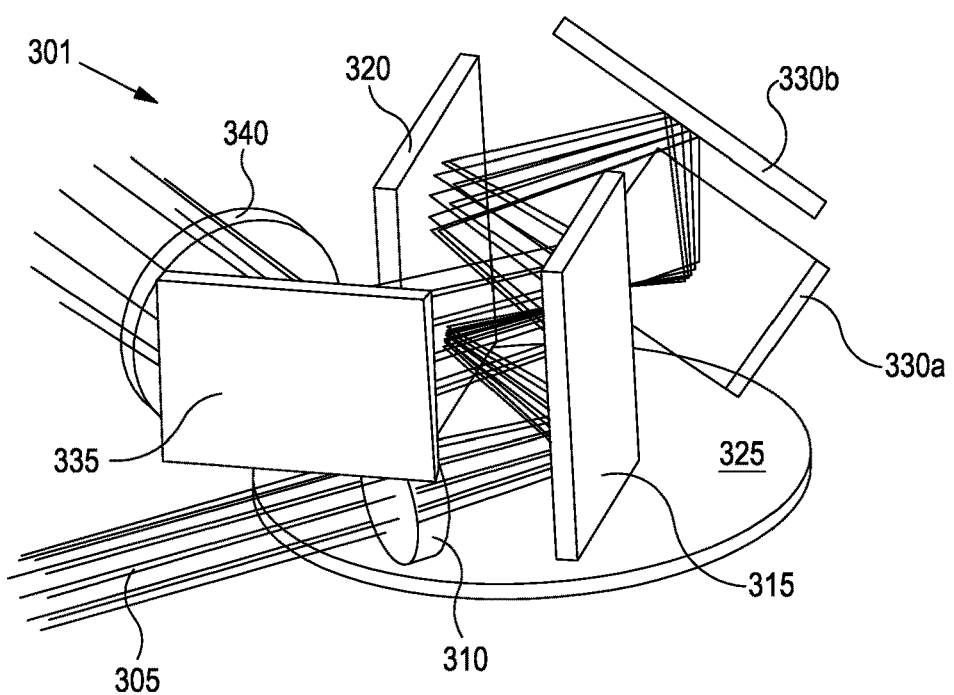

FIGS. 21A and 21B show an embodiment of a variable optical path length device 301 in a plan view and a perspective view, respectively. The variable optical path length device may be housed in a marking head along with the electromagnetic radiation steering mechanism. A light beam 305 is illustrated entering the device through a first lens 310. The light beam 305 may be received from the laser source along an optical fibre, or may be generated within the marking head itself. The first lens 310 may have a diameter of, for example, about 10 mm. After passing through the first lens 310, the light beam 305 impinges onto a first optical element 315, for example, a first of a pair of movable mirrors 315, 320. The light beam 305 is reflected from the reflective surface 315a of the first movable mirror 315 onto the reflective surface 320a of the second mirror 320 of the pair of movable mirrors 315, 320. The pair of movable mirrors 315, 320 is mounted to a rotating base 325 that may rotate about an axis normal to the surface of the rotating base 325. The axis of the rotating base passes through a centre point 302 between the pair of movable mirrors 315, 320.

A rotational actuator (e.g. a galvanometer motor) may be utilized to rotate the rotating base 325 and the pair of movable mirrors 315, 320 as desired.

The light beam 305 is reflected from the reflective surface 320a of the second movable mirror 320 into a corner reflector 330, which may include a pair of perpendicular mirrors 330a, 330b (or alternatively, a reflecting prism with perpendicular reflecting facets). The light beam 305 is reflected from the corner reflector 330 back in the opposite direction from which it entered the corner reflector 330 and impinges back onto the reflective surface 320a of the second movable mirror 320. The light beam 305 impinges on the second movable mirror 320 after being reflected back from the corner reflector 330 at a different vertical position from a position at which the light beam impinged on the second movable mirror 320 after being directed toward the second movable mirror 320 by the first movable mirror 315. The difference in vertical position is related to the vertical distance between portion of the mirrors 330a, 330b of the corner reflector 330 that the light beam 305 reflected off of. The light beam 305 is reflected from the reflective surface 320a of the second movable mirror 320 back onto the reflective surface 315a of the first movable mirror 315. The light beam 305 impinges on the first movable mirror 315 after being reflected back from the second movable mirror 320 at a different vertical position from a position at which the light beam impinged on the first movable mirror 315 from the first lens 310. The light beam 305 is then reflected from the reflective surface 315a of the first movable mirror 315 onto a reflective surface 335a of an output mirror 335. The output mirror 335 is vertically displaced from the first lens 310. The light beam 305 is reflected from the output mirror 335 though a second lens 340, which may also be referred to as an output lens. The second lens 340 is vertically displaced relative to the first lens 310. The light beam passes through the second lens 340 and out of the variable optical path length device 100. The second lens 340 may have a diameter of, for example, about 20 mm.

Of course, suitable optical components (e.g. mirrors, lenses, etc.) may be provided as necessary to direct the beam from the collimator to the input lens 310, and then from the output lens 340 towards a component (e.g. the third reflector 110 or the first optical component 100A) of the electromagnetic radiation steering mechanism.

The reflective surfaces of each of the mirrors and of the corner reflector 330 in the variable optical path length device 100 may be planar. One or both of the lenses 310, 340 may have one or two surfaces that are either concave, convex, or plano (flat) or one of the lenses 310, 340 may have one or both surfaces with different curvature than the other lens 310, 340.

The first and second lenses 310, 340 may be made of a material that is capable of refracting the light beam 305 at the operating frequency of the light beam (e.g. BK7 borosilicate glass, quartz, ZnSe, or Ge), and may have antireflective coating specific to the wavelength of the light beam 305. The mirrors may be similar to those of the electromagnetic radiation steering mechanism.

The mirrors 315, 320 may be referred to collectively, along with the base 325 as a rotatable path length adjuster 360. It will be appreciated that the relationship between focal length and the orientation of the rotatable path length adjuster 360 will depend upon the optical power of the input and output lenses, as well as the geometry of the rotatable path length adjuster 360, and the other components of the variable optical path length assembly 100. For example, by increasing the distance of the mirrors from the axis of rotation, the change in geometric path length for a given rotational change will also increase.

The corner reflector 330 may, in more general terms, be referred to as a fixed optical element. It will be understood that, unlike the mirrors 315, 320, the corner reflector 330 is fixed in position relative to the axis of rotation of the rotatable path length adjuster 360.

It will be understood that, in general terms, the rotatable path length adjuster 360 can be considered to receive a radiation beam along an input path (i.e. from the input lens 310). The rotatable path length adjuster 360 can also be understood to direct the radiation beam along a first intermediate path between the mirror 320 and the corner mirror 330 (having, for example, been first directed to the mirror 320 by the mirror 315).

The corner reflector 330 can thus be considered to receive the radiation beam directed by the rotatable path length adjuster along the first intermediate path, and to direct the radiation beam back toward the rotatable path length adjuster along a second intermediate path.

The rotatable path length adjuster 360 can then be considered to receive the radiation beam along the second intermediate path (i.e. from the corner mirror 330 to the mirror 320). Finally, once the radiation beam has been directed back to the mirror 315 by the mirror 320, the rotatable path length adjuster can finally be understood to direct the radiation beam along an output path (i.e. from the mirror 315 towards the mirror 335). The path from the first mirror 315 to the second mirror 320 may be referred to as a third intermediate path. The path from the second mirror 320 to the first mirror 315 may be referred to as a fourth intermediate path. The mirrors 315, 320 may be referred to, respectively as first and second optical components. In other embodiments, the functions of the first and second optical components may be provided by other optical components.

It will be understood that, as the rotatable path length adjuster 360 is rotated about the axis 302 in a clockwise direction, the physical distance between the input lens 310 and the first mirror 315 will be reduced. Similarly, as the rotatable path length adjuster 360 is rotated about the axis 302 in a clockwise direction, the physical distance between the second mirror 320 and corner reflector 330 will be reduced. On the other hand, as the rotatable path length adjuster is rotated in a clockwise direction, the paths between the mirrors 315, 320 will become more oblique, and therefore longer. However, the changes in the increasing path lengths will be more than offset by the decreasing path lengths resulting in the overall geometric path length (and optical path length) between the input lens and the output lens being decreased. It will be understood that there will be a predictable and continuously variable (although not necessarily linear) relationship between the angular position of the rotatable path length adjuster 360, and the geometric path length between the input and the output. However, the direction of the output path will not vary as the angular position of the rotatable path length adjuster 360 changes (although the start position will change). Thus the input and output locations are fixed with reference to the axis 302 and the position of the corner reflector 330. As such, the beam can be directed into and out of the path length adjuster by fixed optics, and with the path length being varied in order to vary the focal length of the output beam.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. The acts of methods disclosed herein may be performed in alternate orders than illustrated, and one or more acts may be omitted, substituted, or added. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially" similar may be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The electromagnetic radiation steering mechanism may include various types of optical components, such as refractive, reflective, magnetic, electromagnetic, electrostatic, and/or other types of optical components, or any combination thereof, for directing, shaping, and/or controlling electromagnetic radiation.

Although specific reference may be made in this text to the use of an electromagnetic radiation steering mechanism in the marking of products, it should be understood that the electromagnetic radiation steering mechanism described herein may have other applications. Possible other applications include laser systems for engraving products, optical scanners, radiation detection systems, medical devices, electromagnetic radiation detectors such as a camera or a time-of-flight sensor in which radiation may exit and re-enter the sensor, etc.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. An electromagnetic radiation steering mechanism configured to steer electromagnetic radiation to address a specific location within a two-dimensional field of view comprising:
   a first optical element having an associated first actuator configured to rotate the first optical element about a first rotational axis to change a first coordinate of a first steering axis in the two-dimensional field of view;
   a second optical element having an associated second actuator configured to rotate the second optical element about a second rotational axis to change a second coordinate of a second steering axis in the two-dimensional field of view; and
   an electromagnetic radiation manipulator optically disposed between the first and second optical elements, wherein
   a first angle is defined between the first and second rotational axes;
   a second angle is defined between the first and second steering axes; and,
   the electromagnetic radiation manipulator is configured to introduce a difference between the first angle and the second angle, wherein the electromagnetic radiation manipulator comprises a first mirror and a second mirror that are non-rotatable with respect to each other.

2. The electromagnetic radiation steering mechanism of claim 1, wherein the first rotational axis and the second rotational axes are non-orthogonal.

3. The electromagnetic radiation steering mechanism of claim 1, wherein the first rotational axis and the second rotational axes are substantially parallel.

4. The electromagnetic radiation steering mechanism of claim 1, wherein the first angle is less than about 45°, and optionally wherein the first angle is less than about 10°, and optionally wherein the first angle is less than about 5°, and optionally wherein the first angle is less than about 2° and optionally wherein the first angle is about 0°.

5. The electromagnetic radiation steering mechanism of claim 1, wherein the first steering axis and the second steering axis are substantially orthogonal.

6. The electromagnetic radiation steering mechanism of claim 1, wherein the second angle is between about 70° and about 110°, and optionally wherein the second angle is between about 80° and about 100°, and optionally wherein the second angle is between about 85° and about 95°, and optionally wherein the second angle is about 90°.

7. The electromagnetic radiation steering mechanism of claim 1, wherein the electromagnetic radiation manipulator is configured to introduce a difference of more than about 45° between the first angle and the second angle, and optionally wherein the electromagnetic radiation manipulator is configured to introduce a difference of more than about 70° between the first angle and the second angle, and optionally wherein the electromagnetic radiation manipulator is configured to introduce a difference of about 90° between the first angle and the second angle.

8. The electromagnetic radiation steering mechanism of claim 1, wherein the first optical element is adjacent the second optical element.

9. The electromagnetic radiation steering mechanism of claim 1, wherein the first optical element is configured to receive the electromagnetic radiation and direct the electromagnetic radiation to the electromagnetic radiation manipulator, and wherein the electromagnetic radiation manipulator is configured to direct the electromagnetic radiation to the second optical element.

10. The electromagnetic radiation steering mechanism of claim 9, wherein the second optical element is configured to direct the electromagnetic radiation to an optical output of the electromagnetic radiation steering mechanism.

11. The electromagnetic radiation steering mechanism of claim 9, wherein the second optical element is configured to direct the electromagnetic radiation to an optical input of an optical device configured to receive the steered electromagnetic radiation.

12. The electromagnetic radiation steering mechanism of claim 1, wherein at least one of the first optical element and the second optical element is reflective.

13. The electromagnetic radiation steering mechanism of claim 12, wherein the first optical element comprises a first reflective surface configured to receive the electromagnetic radiation and wherein the second optical element comprises a second reflective surface configured to receive the electromagnetic radiation.

14. The electromagnetic radiation steering mechanism of claim 13, wherein the first rotational axis and the first reflective surface are substantially parallel.

15. The electromagnetic radiation steering mechanism of claim 13, wherein the second rotational axis and the second reflective surface are substantially parallel.

16. The electromagnetic radiation steering mechanism of claim 1, wherein at least one of the first optical element and the second optical element is refractive.

17. A method of retrofitting a production system comprising a continuous inkjet marking system comprising:
replacing the continuous inkjet marking system with a laser marking system having an electromagnetic radiation steering mechanism according to claim 1.

18. The electromagnetic radiation steering mechanism of claim 1, wherein at least one of the first and second optical elements is diffractive.

19. The electromagnetic radiation steering mechanism of claim 18, wherein the diffractive optical element comprises a grating.

20. The electromagnetic radiation steering mechanism of claim 1, wherein at least one of the first and second optical elements is polarizing.

21. The electromagnetic radiation steering mechanism of claim 20, wherein the polarizing optical element is configured to change linearly polarized electromagnetic radiation to circularly polarized electromagnetic radiation.

22. The electromagnetic radiation steering mechanism of claim 1, further comprising a variable optical path length assembly configured to define an optical path from an input to an output.

23. The electromagnetic radiation steering mechanism of claim 1, wherein the first mirror is configured to receive the electromagnetic radiation after the electromagnetic radiation has interacted with the first optical element and direct the electromagnetic radiation to the second mirror.

24. A method of steering electromagnetic radiation to address a specific location within a two-dimensional field of view comprising:
receiving electromagnetic radiation at a first optical element that is rotatable about a first rotational axis to change a first coordinate of a first steering axis in the two-dimensional field of view;
directing the electromagnetic radiation to an electromagnetic radiation manipulator optically disposed between the first optical element and a second optical element, wherein the electromagnetic radiation manipulator comprises a first mirror and a second mirror that are non-rotatable with respect to each other;
directing the electromagnetic radiation to the second optical element that is rotatable about a second rotational axis to change a second coordinate of a second steering axis in the two-dimensional field of view;
defining a first angle between the first and second rotational axes;
defining a second angle between the first and second steering axes; and,
using the electromagnetic radiation manipulator to introduce a difference between the first angle and the second angle.

25. A method of marking a product using an electromagnetic radiation steering mechanism comprising:
receiving electromagnetic radiation at a first optical element that is rotatable about a first rotational axis to change a first coordinate of a first steering axis in the two-dimensional field of view;
directing the electromagnetic radiation to an electromagnetic radiation manipulator optically disposed between the first optical element and a second optical element, wherein the electromagnetic radiation manipulator comprises a first mirror and a second mirror that are non-rotatable with respect to each other;
directing the electromagnetic radiation to the second optical element that is rotatable about a second rotational axis to change a second coordinate of a second steering axis in the two-dimensional field of view;
defining a first angle between the first and second rotational axes;
defining a second angle between the first and second steering axes;
using the electromagnetic radiation manipulator to introduce a difference between the first angle and the second angle; and,
steering the electromagnetic radiation about the product by rotating the first and second optical elements.

26. The method of claim 25, wherein the electromagnetic radiation steering mechanism is located within a marking head of a laser marking system, the method further comprising moving the marking head during the marking.

27. A method of detecting electromagnetic radiation comprising:
receiving an electromagnetic radiation at a first optical element that is rotatable about a first rotational axis to change a first coordinate of a first steering axis in the two-dimensional field of view;
directing the electromagnetic radiation to an electromagnetic radiation manipulator optically disposed between the first optical element and a second optical element, wherein the electromagnetic radiation manipulator comprises a first mirror and a second mirror that are non-rotatable with respect to each other;

directing the electromagnetic radiation to the second optical element that is rotatable about a second rotational axis to change a second coordinate of a second steering axis in the two-dimensional field of view;

defining a first angle between the first and second rotational axes;

defining a second angle between the first and second steering axes; and, using the electromagnetic radiation manipulator to introduce a difference between the first angle and the second angle.

28. The method of claim 27, wherein the method further comprises imaging an object using the electromagnetic radiation.

29. A method of assembling an electromagnetic radiation steering mechanism comprising:

mounting a first optical element and an associated first actuator that is configured to rotate the first optical element about a first rotational axis to change a first coordinate of a first steering axis in the two-dimensional field of view;

mounting a second optical element having an associated second actuator that is configured to rotate the second optical element about a second rotational axis to change a second coordinate of a second steering axis in the two-dimensional field of view; and optically disposing an electromagnetic radiation manipulator between the first and second optical elements, wherein the electromagnetic radiation manipulator comprises a first mirror and a second mirror that are non-rotatable with respect to each other, wherein a first angle is defined between the first and second rotational axes and a second angle is defined between the first and second steering axes, wherein the electromagnetic radiation manipulator is configured to introduce a difference between the first angle and the second angle.

* * * * *